(12) United States Patent
Butler et al.

(10) Patent No.: US 10,139,959 B2
(45) Date of Patent: Nov. 27, 2018

(54) SELF-CALIBRATION OF FORCE SENSORS AND INERTIAL COMPENSATION

(71) Applicant: Apple Inc., Cupertino, CA (US)

(72) Inventors: Christopher J. Butler, Cupertino, CA (US); Martin P. Grunthaner, Cupertino, CA (US); Peter W. Richards, San Francisco, CA (US); Romain A. Teil, Cupertino, CA (US); Sinan Filiz, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 113 days.

(21) Appl. No.: 15/038,972

(22) PCT Filed: Nov. 26, 2013

(86) PCT No.: PCT/US2013/071893
§ 371 (c)(1),
(2) Date: May 24, 2016

(87) PCT Pub. No.: WO2015/080696
PCT Pub. Date: Jun. 4, 2015

(65) Prior Publication Data
US 2016/0378255 A1 Dec. 29, 2016

(51) Int. Cl.
*G06F 3/041* (2006.01)
*G01L 1/14* (2006.01)
(Continued)

(52) U.S. Cl.
CPC .............. *G06F 3/0418* (2013.01); *G01L 1/14* (2013.01); *G01L 1/146* (2013.01); *G01L 25/00* (2013.01); *G06F 1/1694* (2013.01); *G06F 3/0346* (2013.01); *G06F 3/044* (2013.01); *G06F 3/0412* (2013.01); *G06F 3/0414* (2013.01)

(58) Field of Classification Search
CPC ....................................................... G06F 3/041
See application file for complete search history.

(56) References Cited

U.S. PATENT DOCUMENTS

| 8,266,971 B1 | 9/2012 | Jones | |
|---|---|---|---|
| 2011/0012869 A1* | 1/2011 | Klinghult | G06F 1/3203 345/178 |

(Continued)

FOREIGN PATENT DOCUMENTS

WO WO 12/050875 4/2012

*Primary Examiner* — Alexander Eisen
*Assistant Examiner* — Cory A Almeida
(74) *Attorney, Agent, or Firm* — Brownstein Hyatt Farber Schreck, LLP

(57) ABSTRACT

A method of calibrating a force sensor that includes an input surface and an array of sensing elements. The input has a number of test locations and is deformable under applied force. The force sensor is mounted in a predetermined test orientation. For each test location of the plurality of test locations on the input surface of the force sensor a predetermined test force to the test location. An element calibration value is measured for each sensing element of the array of sensing elements of the force sensor. An (x, y) deformation map of the input surface of the force sensor corresponding to the application of the predetermined test force to the test location is determined based on the measured element calibration values.

26 Claims, 12 Drawing Sheets

(51) Int. Cl.
*G06F 1/16* (2006.01)
*G06F 3/044* (2006.01)
*G01L 25/00* (2006.01)
*G06F 3/0346* (2013.01)

(56) References Cited

U.S. PATENT DOCUMENTS

| | | | |
|---|---|---|---|
| 2011/0118030 A1* | 5/2011 | Walley | G06F 21/32 463/37 |
| 2011/0254792 A1* | 10/2011 | Waters | G06F 1/1626 345/173 |
| 2013/0082973 A1 | 4/2013 | Wurzel et al. | |

* cited by examiner

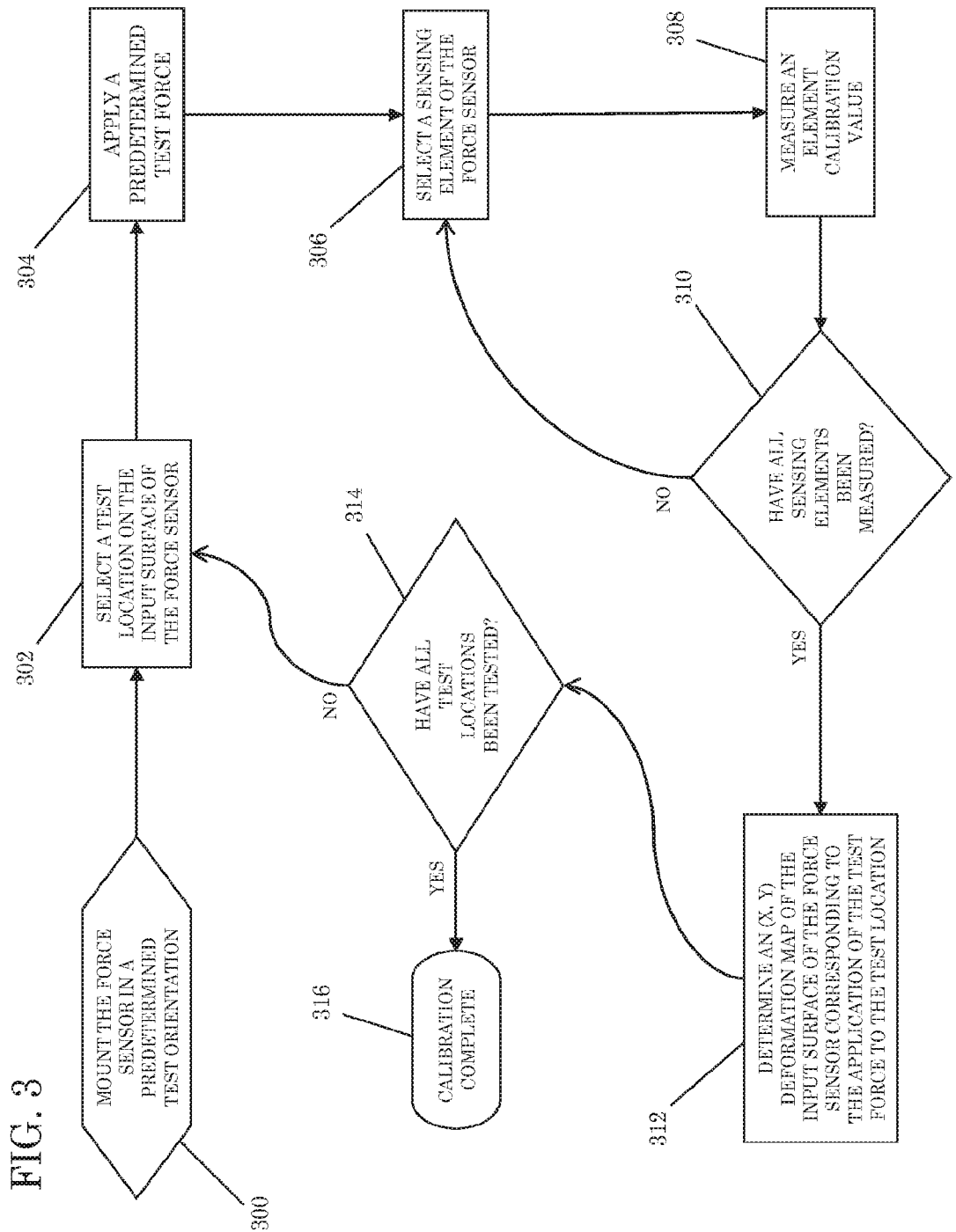

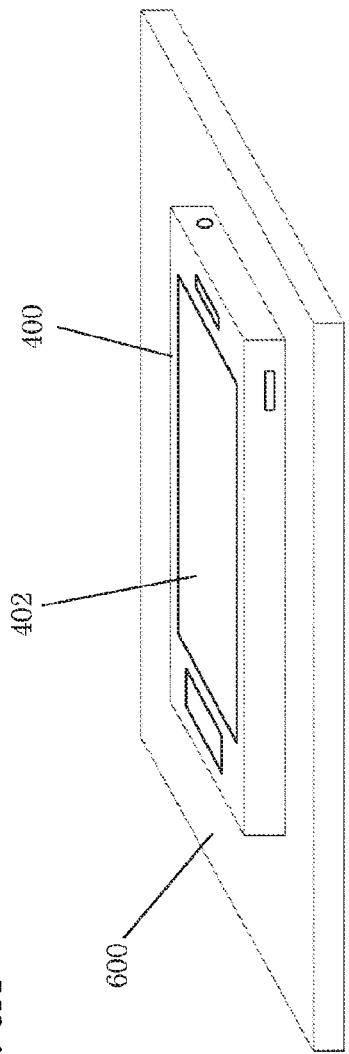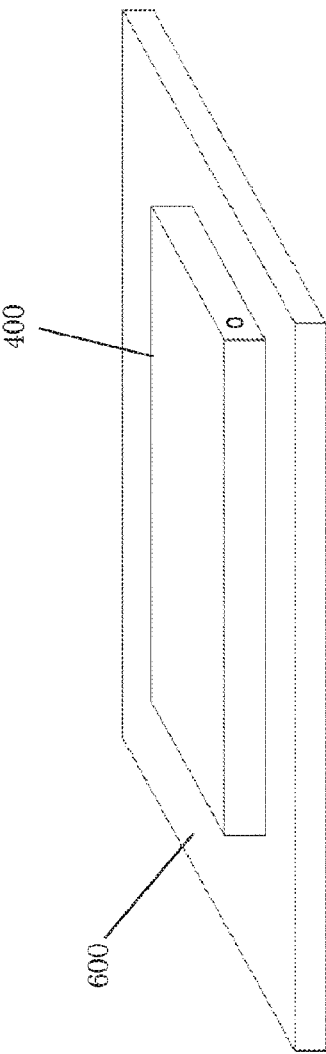
Fig. 6A
Fig. 6B

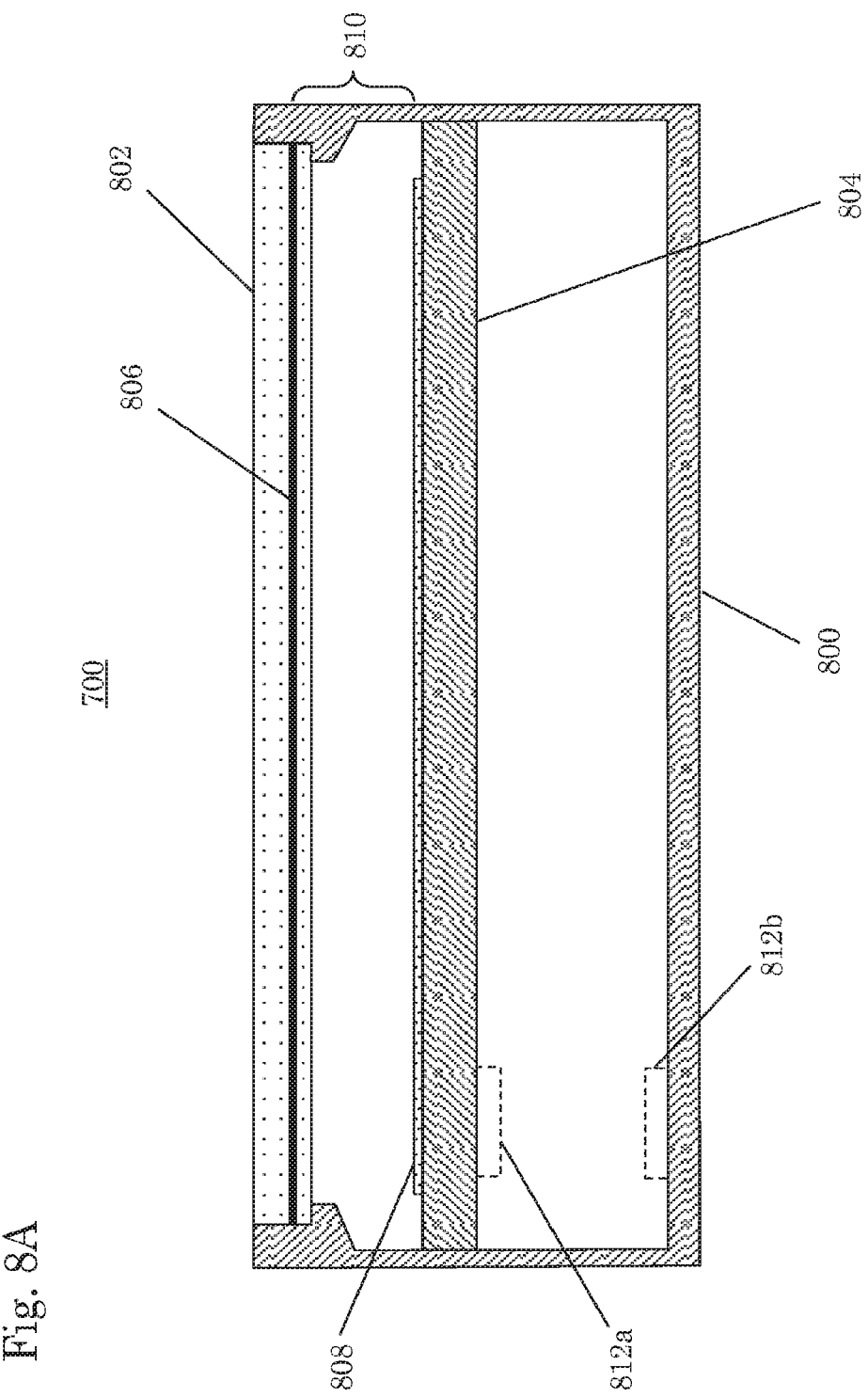

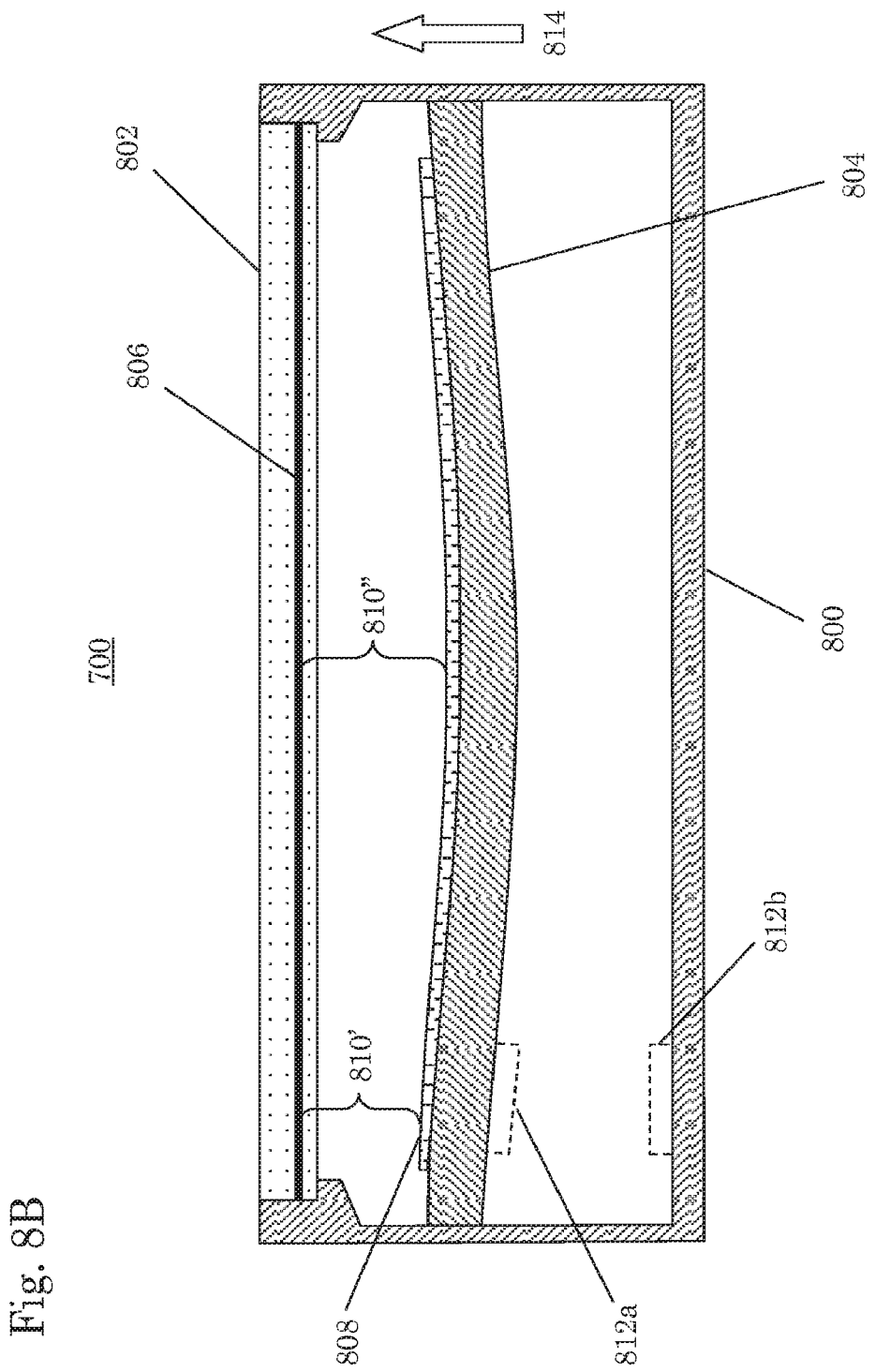

SELF-CALIBRATION OF FORCE SENSORS AND INERTIAL COMPENSATION

CROSS REFERENCE TO RELATED APPLICATION

This application is a 35 U.S.C. § 371 application of PCT/US2013/071893, filed on Nov. 26, 2013, and entitled "Self-Calibration of Force Sensors and Inertial Compensation," which is incorporated by reference as if fully disclosed herein.

BACKGROUND

Field of the Disclosure

This application generally relates to calibration of force sensors, and relates particularly to methods of self-calibrating force sensors and inertial compensation of force sensors.

Background of the Disclosure

Touch devices generally provide for identification of positions where the user touches the device, including movement, gestures, and other effects of position detection. For a first example, touch devices can provide information to a computing system regarding user interaction with a graphical user interface (GUI), such as pointing to elements, reorienting or repositioning those elements, editing or typing, and other GUI features. For a second example, touch devices can provide information to a computing system suitable for a user to interact with an application program, such as relating to input or manipulation of animation, photographs, pictures, slide presentations, sound, text, other audiovisual elements, and otherwise.

Some touch devices are able to determine a location of touch, or multiple locations for more than one touch, using sensing devices that are additional to those sensing devices already part of the touch device.

Generally, however, touch is binary. The touch is present and sensed, or it is not. This is true of many user inputs and input/output devices. A key of a keyboard, for example, is either pressed sufficiently to collapse a dome switch and generate an output signal, or it is not. A mouse button is either pressed sufficiently to close a switch, or it is not. Very few electronic devices employ force as a variable input.

The use of force sensors in personal electronic devices may allow for more complex, yet intuitive, input options between users and their devices. Additionally, these input options may open up new applications for personal electronics devices that incorporate force sensors.

Binary touch sensors may use a minimum level of force to register a touch. A force sensor, however, may register more information than just that the input surface has been touched; it may register a magnitude of the force behind that touch. Like all sensors, it may be useful to calibrate these force sensors to map the output signal of the force sensor to the magnitude of the force behind an input. Additionally, environmental factors, such as age, temperature, damage, or accelerations may affect the calibration of the force sensor.

BRIEF SUMMARY OF THE DISCLOSURE

One example embodiment, as described herein, is a method of calibrating a force sensor that includes an input surface and an array of sensing elements. The input has a number of test locations and is deformable under applied force. The force sensor is mounted in a predetermined test orientation. For each test location of the plurality of test locations on the input surface of the force sensor a predetermined test force to the test location. An element calibration value is measured for each sensing element of the array of sensing elements of the force sensor. An (x, y) deformation map of the input surface of the force sensor corresponding to the application of the predetermined test force to the test location is determined based on the measured element calibration values.

Another example embodiment, as described herein, is a method of recalibrating a force sensor included in a personal electronics device. The force sensor has at least one calibration parameter. Each calibration parameter has a calibrated value. The personal electronics device is set to a force sensor recalibration mode and placed in a predetermined test configuration. A recalibration value for the force sensor is measured in the predetermined test configuration. A recalibrated value for one calibration parameter is calculated based on the at least one calibrated value and the recalibration value.

A further example embodiment, as described herein, is a personal electronics device, including: a force sensor; an accelerometer; and inertial compensation circuitry coupled to the accelerometer and the force sensor. The force sensor includes an input surface and is adapted to provide a sensor signal representative of the total force normal to the input surface measured by the force sensor. The accelerometer is adapted to provide an accelerometer signal representative of the acceleration of the personal electronics device. The inertial compensation circuitry receives the sensor signal and the accelerometer signal. The inertial compensation circuitry determines an inertial compensation signal, which is representative of the inertial force measurable by the force sensor, based on the accelerometer signal and at least one inertial compensation parameter of the force sensor. The inertial compensation circuitry then biases the sensor signal responsive to the inertial compensation signal to generate an acceleration compensated force signal.

An additional example embodiment, as described herein, is method of inertial compensation for a force sensor, including an input surface, that is included in a personal electronics device. The force sensor is characterized to determine at least one inertial compensation parameter of the force sensor. An acceleration value of the personal electronics device is measured and an inertial force offset value is determined based on the measured acceleration value of the personal electronics device and the at least one inertial compensation parameter of the force sensor. A force value for a force applied to the input surface of the force sensor is measured. An acceleration compensated force value is calculated based on the force value and the inertial force offset value.

While multiple embodiments are disclosed, including variations thereof, still other embodiments of the present disclosure will become apparent to those skilled in the art from the following detailed description, which shows and describes illustrative embodiments of the disclosure. As will be realized, the disclosure is capable of modifications in various obvious aspects, all without departing from the spirit and scope of the present disclosure. Accordingly, the drawings and detailed description are to be regarded as illustrative in nature and not restrictive.

BRIEF DESCRIPTION OF THE FIGURES

While the specification concludes with claims particularly pointing out and distinctly claiming the subject matter that is regarded as forming the present disclosure, it is believed that the embodiments are best understood from the following detailed description when read in connection with the accompanying drawing. It should be understood that the various features of the drawing may not be to scale. Likewise, the dimensions of the various features may be altered for clarity. Included in the drawings and/or illustrations are the following figures:

FIG. 3 is a flowchart illustrating an example method of calibrating a force sensor, as described herein;

FIG. 6A is a side perspective drawing of an example personal electronic device illustrating an example test configuration of the example calibration method of FIG. 5;

FIG. 6B is a side perspective drawing of the example personal electronic device of FIG. 6A illustrating another example test configuration of the example calibration method of FIG. 5;

FIG. 8A a simplified side cut-away view of the example personal electronic device of FIG. 7, cut along line 8-8, including an example inertially compensated force sensor, as described herein;

FIG. 8B a simplified side cut-away view of the example personal electronic device of FIG. 7, cut along line 8-8, including the example inertially compensated force sensor of FIG. 8A, during an upward acceleration;

DETAILED DESCRIPTION

Figure 1:
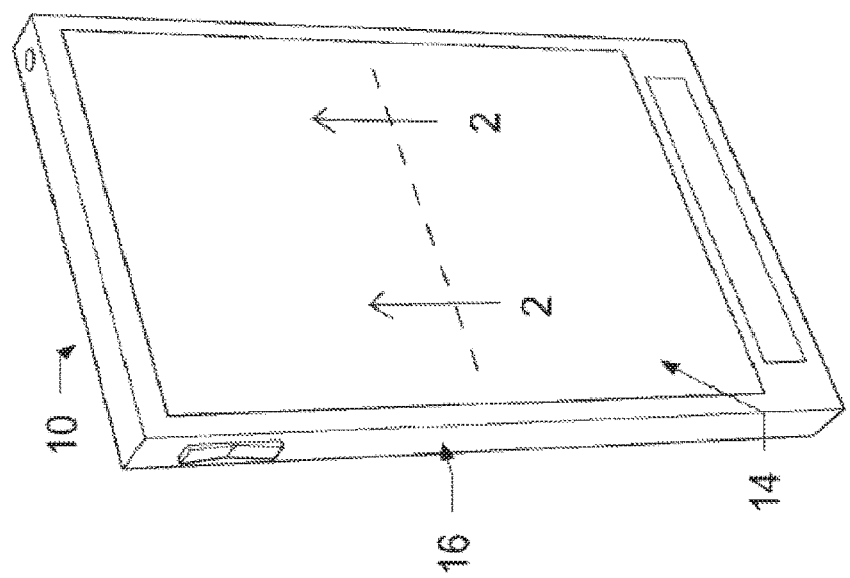
FIG. 1 is a front perspective view of an example of a personal electronic device including a force sensor, as described herein.

Generally, force sensing may add a variety of capabilities to an electronic device. For example, force sensing may permit an electronic device to accept a wide range of inputs and provide a number of outputs beyond simple binary states. In order to provide force sensing capabilities, certain electronic devices may be outfitted with one or more force sensors. As one non-limiting example, a force sensor may be a capacitive force sensor. As described in more detail herein, a capacitive force sensor may measure the capacitance between a sensing element and a ground plane, or two sensing elements. The electronic device may use that measure of capacitance to estimate a force exerted to move the sensing element closer to the ground plane (or vice versa, or to move two sensing elements closer to one another in certain embodiments).

Over time, the distance between a sensing element and an item sensed, whether a ground plane or another sensing element, may vary. For example, mechanical stresses may cause the gap between the sensing element and ground plane or other element to change. This change in gap distance may be localized or may be spread across an entirety or region of the associated electronic device. Likewise, the change in gap distance may vary from location to location.

Thus, it may be useful to determine calibration values for various parameters of example force sensors. These calibration values may allow an example personal electronics device to map the force values measured by the example force sensor described herein onto a predetermined force scale that may be consistent from one personal electronic device to the next (and from one sensing element to the next of a given force sensor).

Additionally, these calibration values may be used to determine a variance over time. In such cases, it may desirable to recalibrate the force sensor from time to time to provide consistent and accurate measurements of force.

Terminology

The following terminology is exemplary, and not intended to be limiting in any way.

The text "applied force", and variants thereof, generally refers to a degree or measure of an amount of force being applied to a device. The degree or measure of applied force need not have any particular scale. For example, the measure of applied force can be linear, logarithmic, or otherwise nonlinear, and can be adjusted periodically (or otherwise, such as aperiodically, or otherwise from time to time) in response to one or more factors, either relating to applied force, location of touch, time, or otherwise. Zero applied force refers to a situation in which no external objects are pressing on the input surface of a force sensor.

The text "force sensor", and variants thereof, generally refers to a sensor system a use to detect applied force. This sensor system may have a single sensing element, or may include a number of sensing elements to detect applied force as a function of position. For example, force sensor may include an array of sensing elements to detect both the magnitude and the (x, y) coordinate of a force applied to the input surface of the force sensor.

The text "force sensing element", "sensing element of a force sensor", and variants thereof, generally refers to one or more sensors or sensing elements, that may detect an input that may be correlated to force, or a direct force input. For example, a capacitive sensing element may serve as a force sensing element by measuring a change in capacitance that occurs due to a deflection or motion of some portion of a device. That change in capacitance may be employed to determine a force acting on the device. Likewise, strain sensors may function as force sensing devices. Generally, a force sensing element may detect an input or generate an output correlative to a force, including information sensed with respect to applied force, whether at individual locations or otherwise. For example and without limitation, a force sensing element may detect, in a relatively small region, where a user is forcibly contacting a device.

The text "surface flex", and variants thereof, generally refers to any substantial amount of flex or other deformation of a device when force is applied to that device. For example and without limitation, surface flex can include deformation, at one or more points, of a cover glass element or other surface of the device, of a device stack positioned below that cover glass element, or otherwise.

The text "user contact", and variants thereof, and references to applied force, or contact, or touch by the user, all generally refer to any form by which a user can apply force to the device. For example and without limitation, this includes contact by a user's finger, or a stylus or other device, such as when used by a user to apply force to a touch device, or to otherwise contact a touch device. For example and without limitation, "user contact" can include any part of the user's finger, the user's hand, a covering on the user's finger, a soft or hard stylus, a light pen or air brush, or any other device used for pointing, touching, or applying force to, a touch device or a surface thereof.

After reading this application, those skilled in the art would recognize that these statements of terminology would be applicable to techniques, methods, physical elements, and systems (whether currently known or otherwise), including extensions thereof inferred or inferable by those skilled in the art after reading this application.

Overview

The present disclosure is related to force sensors, such as capacitive force sensors, that may be incorporated into a variety of electronic or computing devices, including, but not limited to, computers, smart phones, tablet computers, track pads, wearable devices, small form factor devices, and so on. The force sensor may be used to detect one or more user force inputs on an input surface and then a processor (or processing unit) may correlate the sensed inputs into a force measurement and provide those inputs to the computing device. In some embodiments, the force sensor may be used to determine force inputs to a track pad, a display screen, or other input surface.

The force sensor may include an input surface, one or more sensing plates (such as capacitive plates in the case of a capacitive force sensor), a spacing layer, and a substrate or support layer. The input surface provides an engagement surface for a user, such as the external surface of a track pad or the cover glass for a display. In other words, the input surface may receive one or more user inputs directly or indirectly.

The number of sensing plates may depend on the type of force sensor being used. For example, in instances where self-capacitance (or self-inductance) may be used in a capacitive (or inductive) force sensor, a shielding member or plate may replace one of the sensing plates, such that the capacitive (or inductive) force sensor may include one sensing plate and one shielding member or plate. In these examples, the shielding member may help to isolate the sensing plate from noise sources that may produce errors in the sensed inputs. In some embodiments, the sensing elements, such as capacitive sensors, may be defined by the intersections of rows and columns. In these embodiments, the rows and/or columns may be driven any number of ways, for example, sequentially, in a pattern (e.g., groups of rows and/or columns at a time with different waveforms), or simultaneously. In other embodiments, the force sensors may be defined by an array, grid, or other layout of sensing elements that are spaced apart and/or not connected to each other. In the case of strain gauge based force sensors the force sensor may only including one sensing plate, coupled to the input surface.

Turning briefly to the specific example of capacitive force sensors, as described herein, these example force sensors are designed such that applied force on the input surface of the capacitive force sensor causes a change in the separation, or gap width, between the two capacitor plates (whether two sensing plates or one sensing plate and one shielding plate) of capacitor sensing elements in the capacitive force sensor. This change in the gap width may be modeled as proportional to the applied force. Thus, in example capacitive force sensors, as described herein, it may be useful to determine the applied force based on changes in the thickness of the gap width under the applied force, rather than the absolute thickness of the spacing layer.

It is noted, however, that the gap between the two capacitor plates may include multiple layers of different materials, which each may have a different dielectric constant. Thus, to determine the capacitance of an example capacitive sensing element, as described herein, it may be useful to treat the example capacitive sensing element as a number of 'capacitors' connected in series, each having a separation equal with one of the material layers (and having a uniform dielectric constant), as shown in Equation 1:

$1/C_{Total} = 1/C_0 + 1/C_1 + 1/C_2 + \ldots + 1/C_N$; or $1/C_{Total} = z_0/(D_0 A) + z_1/(D_1 A) + z_2/(D_2 A) + \ldots + z_N/(D_N A)$,      Equation 1 where N+1 is the number layers, $C_{Total}$ is the total capacitance of the capacitive sensing element, $C_i$ is the capacitance of the $i^{th}$ series 'capacitor,' $z_i$ is the separation of the $i^{th}$ series 'capacitor,' $D_i$ is the dielectric constant of the material of $i^{th}$ series 'capacitor,' and A is the plate area of the capacitive sensing element.

As may be seen from Equation 1, changes in the total capacitance of the example capacitive sensing element are a nonlinear function of the changes in the capacitances of the series 'capacitors.' If the layers between the capacitor plates are configured so that almost all of the change in the gap width based on a user input occurs in one of these layers, the spacing layer, Equation 1 may be simplified, as shown by Equation 2:

$1/C_{Total\_AF} = (z_0 + \Delta z)/(D_0 A) + z_1/(D_1 A) + z_2/(D_2 A) + \ldots + z_N/(D_N A)$, or rearranged;

$(D_0 A)/C_{Total\_AF} = \Delta z + [z_0 + D_0(z_1/D_1 + z_2/D_2 + \ldots + z_N/D_N)]$, substituting:

$z_{eff} = z_0 + D_0(z_1/D_1 + z_2/D_2 + \ldots + z_N/D_N)$, leads to:

$(D_0 A)/C_{Total\_AF} = \Delta z + z_{eff}$; or $\Delta z = (D_0 A)/C_{Total\_AF} - z_{eff}$,      Equation 2 where $C_{Total\_AF}$ is the total capacitance of the capacitive sensing element under applied force, $\Delta z$ is the gap width change of the $0^{th}$ layer (i.e. the spacing layer) due to the applied force, and $z_{eff}$ is the initial effective separation between the capacitor plates scaled to the dielectric constant of the spacing layer, $D_0$. The spacing layer may be a gap between one or more components of the capacitive force sensing device (e.g., air), or may be a gel, foam, or other deformable material. The spacing layer may typically be configured to change in size or thickness based on a user input. That is, the spacing layer may be deformable or otherwise variable in at least one dimension.

It may be seen in Equation 2 that changes to $z_{eff}$ may affect the sensitivity of $\Delta z$ to changes in capacitance; knowing the value of $z_{eff}$ may facilitate accurately determining the value of $\Delta z$ from capacitance. During manufacture, small variations in the thickness of the various layers separating the capacitor plates may occur between different capacitive force sensors, and even between capacitive sensing elements within the same capacitive force sensor. Thus, an accurate method to determine the effective gap width of the capacitive sensing elements is useful for characterization of the example capacitive force sensor. However, it is noted that $\Delta z$ always less than $z_{\mathit{eff}}$ and may typically be quite small in comparison to $z_{\mathit{eff}}$. And direct measurement of $z_{\mathit{eff}}$ for each capacitive sensing element of an example capacitive force sensor, as described herein, is not trivial and may be impractical for mass production of personal electronics devices. Example embodiments, as described herein, include methods and systems for characterizing example capacitive force sensors, including indirectly determining the effective gap width.

Additionally, the thickness of the spacing layer may change over time due to settling or fatiguing of components of the personal electronics device containing the capacitive force sensor, and/or damage to the personal electronics device. Example embodiments, as described herein, include methods for calibrating or recalibrating (both of which may be examples of self-calibrating) example capacitive force sensors, including indirectly recalibrating the effective gap width. Other example embodiments, as described herein, include example methods and apparatuses for inertial compensation of capacitive force sensors, including methods and apparatuses that include determining approximate changes to the effective gap width due to accelerations, including gravitational accelerations.

Force Sensitive Device and System

Turning now to the figures, illustrative personal electronic devices that may incorporate the capacitive force sensing device may be discussed in more detail. FIG. 1 a front perspective view of a tablet computer used herein as a sample personal electronic device that may incorporate one or more example force sensor, as described in more detail herein. The use of tablet computer 10 is merely illustrative and intended as limited. It is contemplated that example embodiments, as described herein, may be used in other personal electronic devices, such as, but not limited to, laptop or desktop computers, smart phones, tablet computers, track pads, and various wearable devices.

The tablet computer 10 may include a display 14 and an enclosure 16 or frame. The enclosure 16 may extend around a portion of the display 14. In the example embodiment illustrated in FIG. 1, the force sensor may be incorporated into the display 14 to detect force inputs to the display 14. In other example embodiments, the force sensor may be configured to detect force inputs to a track pad and/or other input component.

In one embodiment, the example personal electronic device includes a device frame, such as the enclosure 16, enclosing a set of circuits and data elements. In some embodiments, the circuits and data elements can include a cover glass (CG) element, a display stack, and one or more force sensing layers, such as described herein. The cover glass (CG) element and display stack can be flexible with respect to applied force. This can have the effect that the force sensor can determine a measure of force with respect to surface flex (e.g. capacitance value, inductance value, strain value, or other measured force value), and can determine an amount and location of applied force in response thereto. In the case of capacitive (or inductive) force sensors, as the surface of the cover glass flexes, the compressible gap (e.g., distance between the sensing plates or sensing elements) may decrease, resulting in an increase in the capacitance (or inductance) value measured at one or both of the plates/elements. This increase in capacitance (or inductance) value may be correlated to a force that caused the surface flex, as described in more detail elsewhere herein.

In one embodiment, the cover glass element is coupled to a frame, such as the enclosure 16, for the touch device, such as a case constructed of metal, elastomer, plastic, a combination thereof, or some other substance. In such cases, the frame for the touch device can include a shelf on which the cover glass element is positioned above circuitry for the touch device. For example, the frame can include a shelf on which an edge of the cover glass element is positioned, with at least some of the remainder of the cover glass element positioned over the circuitry for the touch device. In this context, "over" the circuitry refers to being positioned above the circuitry when the display for the touch device is positioned for a user above the touch device.

Figure 2A:
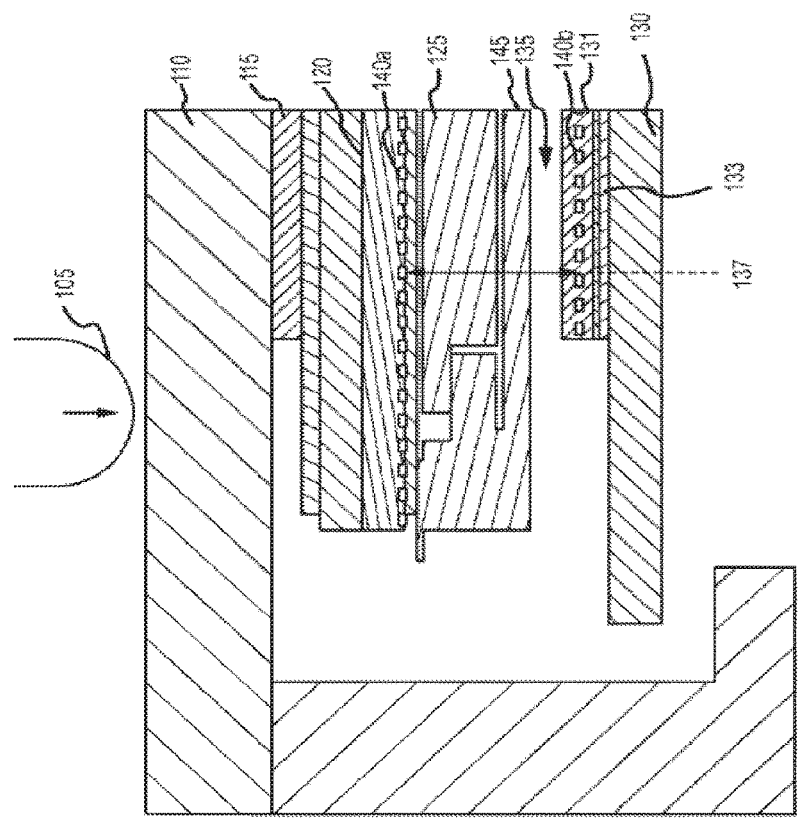
FIG. 2A is a partial side cut-away view of the example personal electronic device of FIG. 1 including an example force sensor, as described herein, cut along line 2-2.
Figure 2B:
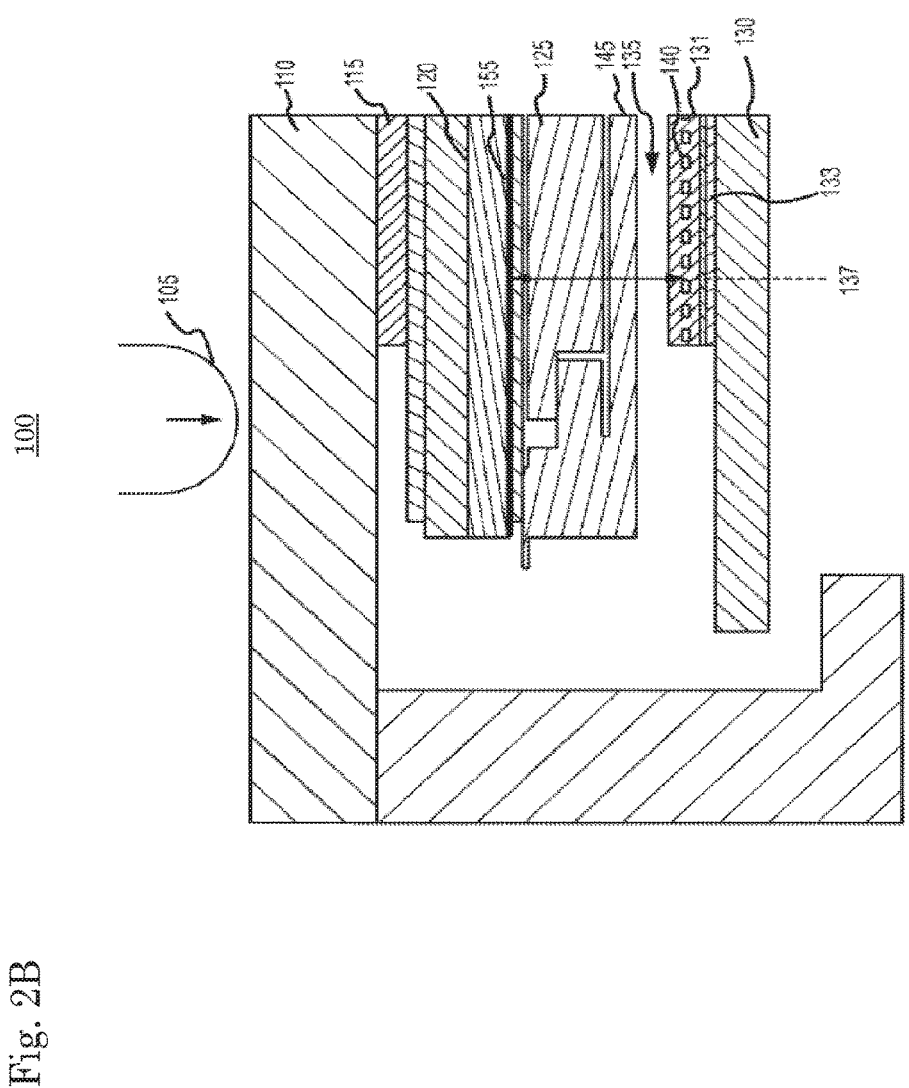
FIG. 2B is a partial side cut-away view of the example personal electronic device of FIG. 1 including another example force sensor, as described herein, cut along line 2-2.

An example capacitive force sensor will now be discussed in more detail. It is noted that an inductive force sensor may be designed similarly, with inductive coils replacing the capacitor plate described in examples of example capacitive force sensors herein. FIGS. 2A and 2B are partial cross-section views of the electronic device (an edge portion illustrating the layers within the example capacitive force sensor and display stack) taken along line 2-2 in FIG. 1.

With reference to FIG. 2A, in one embodiment, a user contacts personal electronics device 100, such as when a user's finger 105, or other object, applies force (shown with reference to an arrow in FIG. 2A), to a cover glass element 110, the input surface, or other element of the device. For example, as described herein, the user's finger 105 can apply force to the cover glass element 110 at one or more locations in which the cover glass element 110 also has a touch sensor (not shown), or can apply force to the cover glass element 110 at one or more locations in which the cover glass element 110 does not have a touch sensor.

In one embodiment, the cover glass element 110 includes a relatively translucent or transparent (in most locations) substance capable of isolating circuitry for the touch device from ambient objects. For example, glass, treated glass, plastic, diamond, sapphire, and other materials can serve as such substances. In one embodiment, the cover glass element 110 is positioned above the device circuits, including an adhesive layer 115. In some embodiments, the edge of the adhesive layer 115 may mark an edge of the visible portion of the display.

In one embodiment, the adhesive layer 115 is substantially translucent or transparent. This can have the effect of allowing a set of display circuits to provide a display to the user, without interference. In one embodiment, the adhesive layer 115 is positioned above a set of display circuits 120.

In one embodiment, the display circuits 120 provide a display to the user, such as a GUI or an application program display, although it should be appreciated that some portion of the display circuits 120 are dedicated to integrated circuitry that is typically not visible to a user and does not provide any output visible by a user. Such an area may be, for example, to the left of the edge of the adhesive layer 115 (with respect to the orientation of FIG. 2A). In one embodiment, the display circuits 120 are positioned above a back light unit (BLU) 125.

In one embodiment, the back light unit 125 provides a back light for the display circuits 120. A support structure 145 may support the back light unit 125 and/or the display 120.

In one embodiment, the device can include a compressible gap 135 or spacing layer that is part of a larger sensing gap 137 defining a distance between the two capacitive sensing elements 140a, 140b. For example, the compressible gap 135 can include an air gap, a gap at least partly filled with a compressible substance (such as a substance having a Poisson's ratio of less than about 0.48), or a gap at least partly filled with a compressible structure.

As shown in FIG. 2A, an applied force (shown with respect to the arrow) can cause the cover glass element 110 or other device element to exhibit surface flex. This can have the effect that one or more elements in the device are brought closer together in response to the applied force. As described herein, a capacitive force sensor detecting or measuring one or more capacitive changes can determine an amount and location of that applied force based on those capacitive changes. In short, a capacitive force sensor may include one or more capacitive sensing elements.

In one embodiment and returning to FIG. 2A, the compressible gap 135 or sensing gap can be positioned in one or more of several positions in the device. For some examples: (A) The compressible gap 135 can be positioned above the display circuits 120, such as below the cover glass element 110, below the adhesive layer 115, and above the display circuits 120; (B) the compressible gap 135 can be positioned below at least a portion of the display circuits 120, such as below a polarizer element, as described herein. In such cases, the polarizer can be a part of the display circuits; and (C) the compressible gap 135 can be positioned below the back light unit 125 and above the internal structural element 130, which may be, for example, the midplate of the personal electronics device. It should be appreciated that a compressible gap may be located elsewhere in the device, and so the foregoing are merely examples of locations.

In one embodiment, the force sensor can include two capacitor plates 140a and 140b, disposed to determine an amount of capacitance change in response to surface flex. The capacitor plates 140a and 140b can include either mutual capacitance or self-capacitance features, as described herein. In cases in which capacitor plates 140a and 140b includes mutual capacitance features, the capacitor plates 140a and 140b can be disposed in drive/sense rows/columns. In cases in which capacitor plates 140a and 140b includes self capacitance features, one of capacitor plates 140a and 140b may be a shield plate, as illustrated by shielding plate 155 in FIG. 2B.

Thus, capacitor plates 140a and 140b may be arranged in a variety of configurations, including linearly, in an array, or at irregular intervals. References to a "capacitor plate" herein are generally meant to encompass multiple capacitive sensing elements in an appropriate configuration, as well.

Further, although certain figures (such as FIGS. 2A and 2B) depict the capacitive sensing element as terminating at an edge of a visible display, it may be appreciated that the capacitor plates may extend into a border region, beyond an edge of the visible display, to provide force sensing in such a region.

In some embodiments, the capacitor plates 140a and 140b can include at least portions that are substantially opaque or translucent or transparent, as described herein. In cases in which at least a portion of the capacitor plates 140a and 140b is positioned above the back light unit 125, those portions are substantially translucent or transparent.

Generally, in one embodiment approximately 100 grams of force applied to the front of the cover glass may cause the sensing gap 137 between elements 140a and 140b to reduce in dimension by approximately 1.6 micrometers. Likewise, an upward or outward force applied to the cover glass may cause the sensing gap 137 to increase in dimension. It should be appreciated that the exact ratio of force to change in sensing gap 137 may vary between embodiments, and the numbers provided herein are meant purely as one example. It should also be appreciated that the sensing gap 137 may include intermediate elements between the sensing elements 140a and 140b; that is, the entire gap may not be solely air.

Regardless, as the sensing gap 137 decreases, the capacitive sensing elements move closer to one another and thus the capacitance measured between the elements 140a, 140b may increase. In a mutual capacitance system employing multiple planes of capacitive sensing elements, as shown in FIG. 2A, this change in the mutual capacitance may result from a change in the distance between two capacitive sensing elements, for example due to a surface flex of the cover glass or other surface on which a force is exerted. Accordingly, as the distance changes with the force exerted on the cover glass, the change in mutual capacitance may be correlated to a force exerted to create the change in distance/surface flex.

In one embodiment, the amount and location of surface flex can be distributed with respect to the surface of the device, such as with respect to a usable surface of the cover glass element 110, and can be responsive to one or more locations where applied force (such as by the user's finger) is presented to the surface of the device.

In one embodiment, the capacitance sensing element 140a and 140b can be integrated into a device circuit that is disposed for touch sensing. This would have the effect that circuits for detection and measurement of applied force can integrated together with circuits for detection of touch.

It should be appreciated that either of the capacitive sensing plates 140a or 140b may be replaced with a ground or shield layer. By replacing either of the capacitive sensing elements with a shield layer, the device may employ a self-capacitive force sensor. FIG. 2B illustrates such an embodiment. As shown, capacitive sensing plate 140 may be positioned at or adjacent internal structural element 130, which may the midplate or another support structure that is relatively immobile with respect to a frame or enclosure of the electronic device. For example, the element may be placed on a graphite layer or other substrate 133 and/or a within flexible circuit 131, affixed to the midplate. It should be appreciated that the capacitive sensing elements need not be placed within a flexible substrate 131, although this is shown in FIG. 2B. In this example embodiment, the capacitive sensing elements of capacitor plate 140 may measure their capacitance with respect to the ground layer 155.

Forces exerted on the cover glass 110 will generally cause the display stack beneath the glass to move downward, at least to a small extent. Accordingly, distance between the ground layer 155 and capacitive sensing plate 140 (i.e. the gap width) may decrease, which in turn may cause the capacitance measured by the capacitive sensing elements to increase. Likewise, as a force is removed from the cover glass, the ground layer 155 may move away from the capacitive sensing plate 140 and so the measured capacitance may decrease. These changes in capacitance are generally due to the force exerted on the cover glass, for example by a user's finger 105.

In addition, the ground layer 155 may shield the capacitive sensing element from external noise, cross-talk and parasitic capacitances. The ground layer may be passive or actively driven to a voltage, depending on the embodiment.

In other embodiments, the positions of the ground layer 155 and the capacitive sensing plate 140 may be reversed, such that a force exerted on the cover glass may move the capacitive sensing element while the ground plane remains immobile. Otherwise, operation of such an embodiment is generally the same as has been previously described.

Although embodiments have been discussed with respect to a display and a cover glass, it should be appreciated that alternative embodiments may omit one or both elements. For example, the cover glass may be replaced by a trackpad surface and the display stack may be omitted, while the ground layer is affixed to an underside of the trackpad surface. Such an embodiment would operate to measure (or more precisely, estimate) force exerted against the surface of the trackpad.

Arrangement of Capacitive Sensing Elements.

Generally, the capacitive sensing elements of the capacitive plates (140a and 140b in FIG. 2A and 140 in FIG. 2B) may be arranged in an array (here, shown as a grid) of any desired shape and/or size. Each capacitive sensing element may be connected by its own dedicated signal trace to an integrated circuit that receives the output of the capacitive sensing element and may, for example process that output in order to correlate it to a force exerted on a cover glass or other surface. The integrated circuit may include one or more processing units to perform such operations, for example. It should be appreciated that the integrated circuit may be located remotely from the capacitive sensing array and may be displaced therefrom substantially along any axis.

The array of capacitive sensing elements may be placed in the position or positions shown by capacitive sensing plates 140a and 140b in FIG. 2A or capacitive sensing plate 140 in FIG. 2B, or anywhere else a capacitive sensing plate is shown or discussed herein.

Each capacitive sensing element of example capacitive force sensors, as described herein, effectively functions to sense a change in capacitance due to a surface flex directly above its area. As previously mentioned, this change in capacitance may be correlated to a force, which in turn may be used as an input for a personal electronic device. As may be understood from Equation 1, the resolution of the array to a force may be varied by varying the effective gap width between capacitive sensing plates 140, varying the areal size of the elements, or both. It should be appreciated that there is no requirement that the effective gap width and/or the areal size of the elements remain constant in any embodiment. Thus, some embodiments may have regions where the capacitive sensing elements are smaller and/or have a different effective gap width than in other regions. As noted above, the effective gap width may change if the capacitor plates are positioned closer together or farther apart, or the composition of layers within the gap changes. This may provide a surface for a personal electronic device that has variable resolution of force across its area.

In one embodiment, the force sensitive device and system determines an amount of force applied to each individual force sensing element of the force sensor. This can have the effect of producing a map of applied force at each individual force sensing element, sometimes herein called a "heat map," or an (x, y) deformation map. For example, the heat map of applied force can show both the amount of applied force, but also the location at which that force is applied.

For example, an amount of applied force Fa at an applied location [X, Y] can provide a substantial amount of sensed force Fs, even a substantial distance away from the applied location [Xa, Ya], such as at a sensed location [Xs, Ys]. This can be due to substantial surface flex being detected at the sensed location [Xs, Ys]. In one embodiment, a force sensitive device can determine the applied force Fa at the applied location [Xa, Ya] in response to the heat map of sensed forces Fs at sensed locations [Xs, Ys]. For example, the force sensitive device can determine a set of local maxima of sensed forces Fs at sensed locations [Xs, Ys], and conclude that the local maximum of sensed forces Fs is also the location and amount of applied force Fa.

In alternative embodiments, one or more touch sensors can also assist in determining a location at which force is applied, in response to determining a location of touch. The touch sensors may detect a user touch on an input surface of an electronic device, for example. Concurrently or additionally, one or more force sensors may determine that a force has been applied to the input surface. Insofar as an overall force is known and a location of a touch (or touches, in the case of multitouch-capable touch sensors), a force may be assigned to a particular location on an input surface corresponding to a touch. In the event that a single touch is detected, the force may be assigned completely to the location of the touch. If multiple touch locations are detected, then the force may be weighted and assigned to the various touch locations through a variety of manners. As one example, the sensed force may be greater in one portion of the input surface than in another. If a touch is near this portion, a majority of a force may be assigned to that particular touch location. A centroid of the applied and sensed forces may also be determined if a number of touch locations is known, insofar as an embodiment may presume that at least some amount of force is exerted at each touched location. The centroid may be used to assign force to the various touch locations, for example based on the touch locations' distances from the centroid. Yet other manners of associating force with one or more touch locations, as measured by one or more touch sensors, may be employed by alternative embodiments.

Measured Capacitance Versus Actual Capacitance

As discussed above, the capacitance of individual example capacitive sensing elements may be correlated to a change in the gap width between the capacitor plates of the capacitive sensing element, using Equation 2. Additionally, the change in the gap width between the capacitor plates of the capacitive sensing element is a monotonic function of the applied force. In some example embodiments, as described herein, the materials of the flexible element (for example, the cover glass 110, adhesive layer, 115, and display stack 120 in FIGS. 2A and 2B) may be selected and shaped such that the applied force is approximately proportional to the gap width change across an expected range of applied forces; however, this is not necessary for changes in capacitance of the capacitive sensing element to be correlated to applied force (albeit a, possibly nonlinearly, scaled applied force), using Equation 2.

It is noted, however in example embodiments described herein, that the actual capacitance of a capacitive sensing element is not necessarily same as the measured 'capacitance value' that is used by the processor in the personal electronics device to determine the applied force. In many example embodiments, the measured capacitance value may be proportional, but not equal, to the actual capacitance of the capacitive sensing element, i.e. there may be a capacitive sensor gain associated with the capacitive sensing element. This capacitive sensor gain may be due to preamplifier stages or other circuitry involved with determining the measured capacitance value. Additionally, there may be a capacitive sensor offset, so that if the graph representing the measured capacitance value versus the actual capacitance is extended to an actual capacitance of zero there remains a non-zero measured capacitance value. This capacitive sensor offset, and the capacitive sensor gain, may be useful to scale the measured capacitance value such that, for all anticipated actual capacitances, it remains within a predetermined range of capacitance values, thus simplifying processor requirements. Equation 3 illustrates this example relationship between the measured capacitance value and the actual capacitance of an example capacitive sensing element:

$$C_{Meas} = K_{off} + K_{gain} C_{Act},$$ Equation 3 where $C_{Meas}$ is the measured capacitance value of the capacitive sensing element, $K_{off}$ is the capacitive sensor offset, $K_{gain}$ is the capacitive sensor gain, and $C_{Act}$ is the actual capacitance of the capacitive sensing element. Furthermore, it is noted that this linear relationship between the actual capacitance of a capacitive sensing element and its measure capacitance value may be accurate only within a predetermined range; however, the circuitry of the example capacitive force sensor may be designed so that this predetermined range is at least as broad as the range of anticipated actual capacitances.

Therefore, to perform accurate force measurements using example capacitive force sensors, as described herein, it may be useful to know the capacitive sensor gain and the capacitive sensor offset, in addition to the effective separation of the capacitor plates at zero applied force. Expected values for the capacitive sensor gain and the capacitive sensor offset may be specified during design of the circuitry associated example capacitive force sensors, as described herein; however, maintaining tight tolerances on these specifications may be impractical during mass production of personal electronics devices including example capacitive force sensors, as described herein. And like the effective separation, the capacitive sensor gain and the capacitive sensor offset may vary from one capacitive force sensor to the next, or even one capacitive sensing element to the next within a single capacitive force sensor. Thus, for complete characterization of example capacitive force sensors, as described herein, it may be useful to determine the capacitive sensor gain, the capacitive sensor offset, and the effective separation of the capacitor plates at zero applied force may prove useful.

One skilled in the art may understand that similarly useful characterization parameters may be determined for an inductive force sensor. Characterization parameters for example strain gauge based force sensors and other force sensors may be determined as well.

It is additionally useful to determine calibration values for various parameters of example force sensors. These calibration values may allow an example personal electronics device to map the force values measured by the example force sensor described herein onto a predetermined force scale that may be consistent from one personal electronic device to the next (and from one sensing element to the next of a given force sensor).

Additionally, these calibration values may vary over time. For example, the structural elements of the personal electronics devices to which the sensor components (such as the capacitor plates of an example capacitive force sensor) are coupled may move relative to one another due to settling over time, or possibly due to damage or wear to the personal electronics device. In such cases, it may desirable to recalibrate the force sensor from time to time.

Furthermore, environmental factors may affect the calibration of example force sensors as described herein. For example, force sensors may be affected by accelerations, including accelerations due to gravity. The structural element of the personal electronics devices that includes the input surface of the force sensor is capable of flexing under applied force, but it is also capable of flexing in response to gravity due to its mass, or in response to other accelerations, such as jostling while the user in walking or in a vehicle driving on a bumpy road, i.e. due to inertia. This flexing of the input surface of the force sensor due to gravity or other accelerations may mimic an applied force. However, this "inertial offset" may vary depending on the angle between the acceleration vector and the normal of the input surface, causing the force sensor to different applied forces in different orientations. For example, the flex of the input surface due to gravity may be at a maximum when input surface is horizontal and at a minimum when the input surface is vertical. Additionally, the direction of the flex when the input surface is not vertical may depend on whether the input surface is general face upward or downward, meaning that the resulting inertial offset may appear as a positive or a negative applied force offset, respectively. Additionally, the amount of flex may vary across the input surface, such that in an example force sensor including an array of sensing elements each sensing element may experience a different inertia offset.

In the case of capacitive (or inductive) force sensors, the first sensing plate is coupled to the same structural element of the personal electronics device (e.g., the cover glass and display stack as illustrated in FIGS. 2A and 2B) as the input surface. However, the second sensing plate for the force sensor is coupled to another structural element of the personal electronics device (e.g., the midplate), and this structural element may flex due to accelerations as well, possibly even more than the input surface.

It is contemplated that it may useful to determine and compensate for these inertial offsets in example force sensors. Thus, it may be useful during characterization of example force sensors, described herein, to determine and inertial compensation parameters of the force sensor and calibrate value for these parameters Example embodiments, as described herein, include methods for calibrating and recalibrating example force sensor included in personal electronics devices. Additionally, example embodiments, as described herein, include methods and apparatuses for inertial compensation of example force sensors included in personal electronics devices.

FIG. 3 illustrates an example method of calibrating a force sensor, as described herein. The force sensor includes an array of sensing elements and an input surface. The input surface is deformable under an applied force and has a number of test locations.

The force sensor is mounted in a predetermined test orientation, step 300. As described in detail herein, the orientation of a force sensor may affect the force values measured by the force sensor to the effects of gravitational acceleration on the force sensor. Therefore, mounting every force sensor in the same predetermined test orientation may be useful to ensure consistency between sensors. In the case of force sensors to be included in personal electronics devices, this consistency may be desirable to allow for ease of repair and/or replacement, as well as providing consistent performance between devices. In one example embodiment, the input surface of the force sensor may be substantially horizontal and facing upward in the predetermined test orientation.

An element baseline value may be measured for each sensing element of the force sensor to provide a reference for other force calibration measurements of the example force sensor. These element baseline values may be measured with the force sensor in the predetermined test orientation and zero applied force on the input surface of the force sensor.

A first test location on the input surface of the force sensor is selected, step 302, and a predetermined test force is applied to the test location, step 304. The predetermined test force may be applied to the test location using a probe adapted to apply the predetermined test force in a direction substantially normal to the input surface of the force sensor when it is mounted in the predetermined test orientation. The probe may be designed to approximate a human finger, stylus, or other device that may be used to apply force to the input surface.

It is noted that it may be useful to apply a number of different predetermined test forces to the test location. This may be particularly useful if the example sensing elements of the force sensor may have a nonlinear response to force.

A sensing element of the array of sensing elements of the force sensor, step 306, and an element calibration value is measured, step 308. This process is repeated for each sensing element of the array of sensing elements until all of the sensing elements have been measured, step 310. If multiple predetermined test forces are to be applied to the test location then steps 306, 308, and 310 are repeated for each test force such that a corresponding number of element calibration values are measured.

If the example force sensor is the force sensor is a capacitive force sensor or an inductive force sensor, the force sensor may include, as described above in detail, a first sensor plate fixedly coupled to the input surface and a second sensor plate separated from the first sensor plate by a compressible gap, with the sensor plates designed to form the array of sensing elements. In this example case, the element calibration value measured of each sensing element is a capacitance value, or an inductance value, of the sensor element, and the element calibration value of each sensing element is a monotonic function of the width the compressible gap between of the portions of the sensor plates corresponding to that sensor element.

Once, the element calibration values of all of the sensing elements of the force sensor have been measured, an (x, y) deformation map of the input surface of the force sensor corresponding to the application of the predetermined test force to the test location is determined, step 312, based on the measured element calibration values. If a set of element baseline values were measured, these element baseline values may be used in the determination of the (x, y) deformation map of the input surface of the force sensor, as well. Also, if multiple predetermined test forces were used the sets of corresponding element calibration value for each of the plurality of predetermined test forces may be used to determine an (x, y, force) deformation map of the input surface of the force sensor that corresponds to the application of the various test forces to the test location.

Figure 4B:
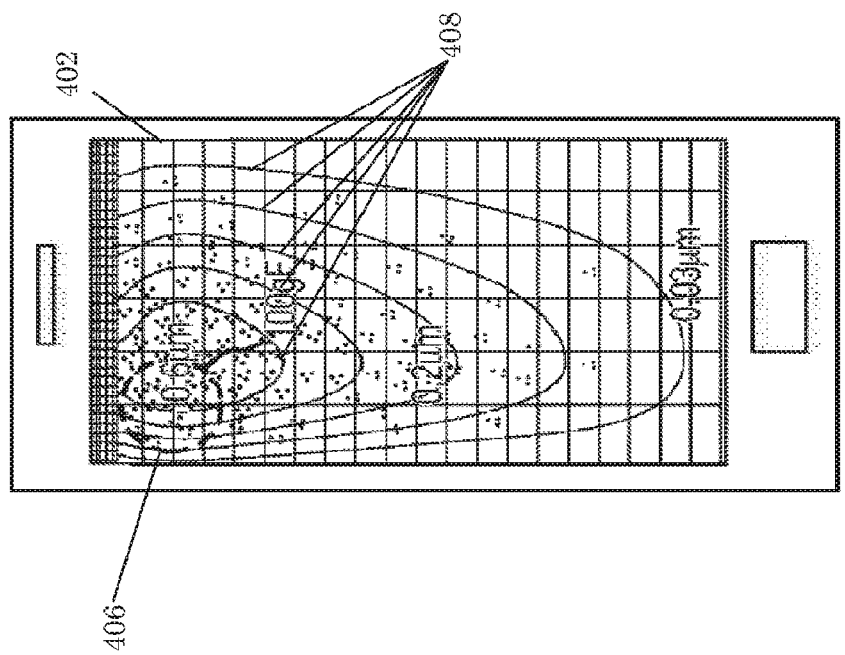
FIG. 4B is a front plan view of the example personal electronic device of FIG. 4A illustrating another example force sensor response to another test force applied during the example calibration method of FIG. 3.
Figure 4A:
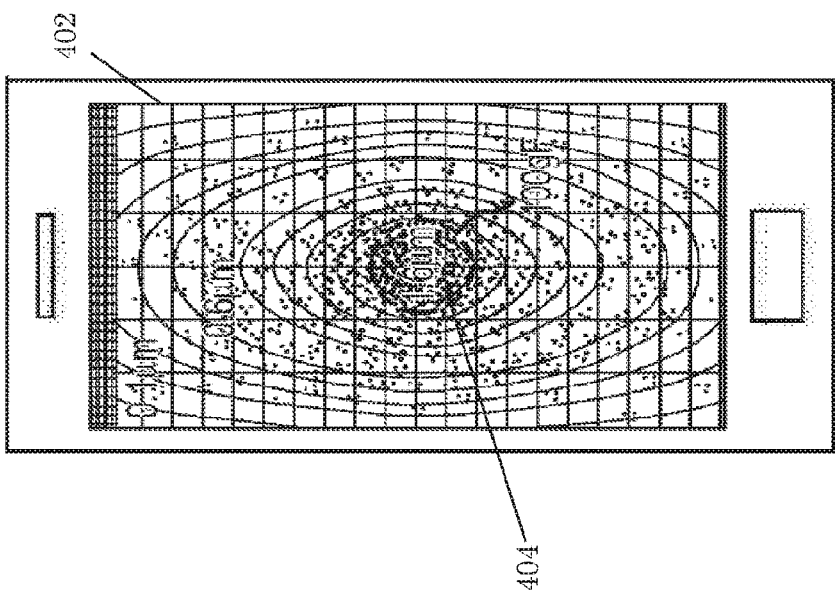
FIG. 4A is a front plan view of an example personal electronic device illustrating an example force sensor response to a test force applied during the example calibration method of FIG. 3.

FIGS. 4A and 4B illustrate two such example (x, y) deformation maps, or 'heat maps,' of the input surface of example force sensor 402, which is included in personal electronic device 400, shown as a smartphone in these example figures. It is noted that the use of a smartphone as personal electronic device 400 in these figures is merely illustrative and is not intended as limiting. In FIG. 4A, a test force of 100g has been applied to test location 404 of the input surface of force sensor 402. In this example, the test force has caused a maximum deformation of 1.6 microns at test location 404. In FIG. 4B, a test force of 100g has been applied to test location 406 of the input surface of force sensor 402. In this example, the test force has caused a maximum deformation of 0.6 microns at test location 406. Isobars 408 represent lines of equal deformation of the input surface due to the applied force.

Returning to FIG. 3, there is a query whether all of the predetermined test locations on the input surface of the example force sensor have been tested, step 314, if not, the next test location is selected, step 302, and steps 304, 306, 308, 310, 312, and 314 are repeated until all of the predetermined test locations on the input surface of the example force sensor have been tested.

Once all of the predetermined test locations on the input surface of the example force sensor have been tested, the calibration is complete, step 316. A lookup table of these (x, y) deformation maps of the input surface of the force sensor may be stored in memory of the sensor, or the personal electronic device in which it is assembled. Anticipated (x, y) deformation maps of the input surface of the force sensor for other applied forces may be determined by interpolating between the calibrated (x, y) deformation maps of the input surface of the force sensor. These anticipated (x, y) deformation maps of the input surface of the force sensor may be used to determine force measurements for various applied forces. It is also contemplated that these various calibrated (x, y) deformation maps of the input surface may be used to determine 'multi-force' measurements in which the user applies force to multiple input surface locations simultaneously to create even more complicated input 'gestures.' Alternatively, the (x, y) deformation maps of the input surface of the force sensor may be used to create an algorithm to interpret force sensor measurements of applied forces for the example force sensor.

Figure 5:
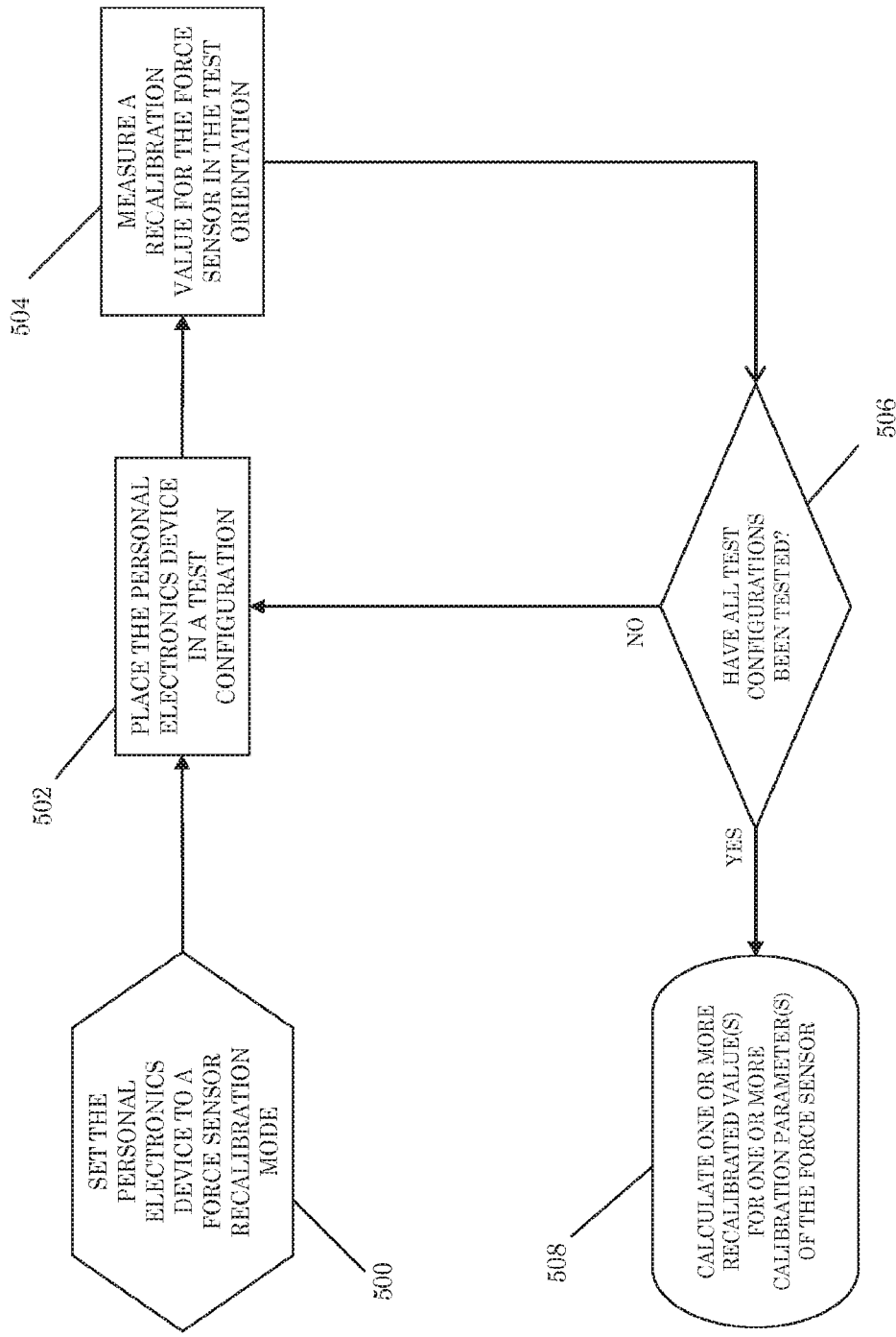
FIG. 5 is a flowchart illustrating an example method of recalibrating a force sensor, as described herein.

FIG. 5 illustrates an example method of recalibrating a force sensor included in a personal electronics device, as described herein. The example force sensor has at least one calibration parameter, which each has a calibrated value. The personal electronics device is set to a force sensor recalibration mode, step 500. This may be accomplished by activation of the force sensor recalibration mode by a user. Alternatively, the personal electronics device may be set to the force sensor recalibration mode by self-activation of the personal electronics device. This self-activation of the force sensor recalibration mode may occur following a predetermined period of time during which a maximum change in force measured by the force sensor is less than a predetermined minimum force precision of the force sensor. For example, self-activation may occur while the personal electronic device is stationary and sitting on a surface, such as at night and/or during recharging.

The personal electronics device is placed in a predetermined test configuration, step 502. In the case that the personal electronics device is set to the force sensor recalibration mode by self-activation, it may be useful for the personal electronics device to detect that it is in the predetermined test configuration before self-activating the force sensor recalibration mode. In one example embodiment, the force sensor has an input surface and the predetermined test configuration, the force sensor of the personal electronics device is arranged such that there is substantially zero applied force on the input surface in the predetermined test configuration. For example, the personal electronics device may be arranged such that the input surface of the force sensor is substantially horizontal and facing upward in the predetermined test configuration, as illustrated in FIG. 6A. In this figure, personal electronics device 400 (in this example a smartphone) is placed on horizontal surface 600 with input surface 402 of the force sensor facing upward.

A recalibration value for the force sensor is measured in the predetermined test configuration, step 504. The measured recalibration value may be the force value measured by the example force sensor. In the case of an example capacitive force sensor, for example, this may be the capacitance value of the force sensor in the predetermined test configuration. If the example force sensor includes an array of sensing elements, the measured recalibration value may include the force values measured by each of the sensing elements, or possibly by a subset of the array of sensing elements.

Once the recalibration value(s) for the force sensor has (have) been measured in the predetermined test configuration, it is determined whether there are any more test configurations to test, step 506. If so the personal electrics device is placed in the next test configuration, step 502, and another recalibration value(s) for the force sensor is (are) measured, step 504. This is continued until all of the predetermined test configurations have been tested. It is noted that if the example recalibration method includes multiple test configurations, it may be useful for the recalibration mode to be user activated.

FIGS. 6A and 6B illustrate one possible pair of example test configurations that may be used with the example method of FIG. 5. In FIG. 6A, personal electronics device is place on substantially and smooth horizontal surface 600 with input surface 402 of the force sensor facing upward. In FIG. 6B, personal electronics device is place on substantially and smooth horizontal surface 600 with the input surface (not shown in FIG. 6B due to perspective) of the force sensor facing downward. Using these two example test configurations may allow for one test configuration in which the input surface 402 of the force sensor is under zero applied force (FIG. 6A), and a second in which there is an applied force equal to the weight of the personal electronics device applied uniformly to the input surface of the force sensor (FIG. 6B).

Although surface 600 in FIGS. 6A and 6B is shown as substantially horizontal, it is contemplated that a surface that is at some angle to the horizontal may be used in example embodiments, as described herein, as well. In such an example case, it may be useful to know the angle that the surface makes to the horizontal, particularly for the example configuration of FIG. 6B. This angle may be an input parameter to the personal electronics device in recalibration mode. Alternatively, the personal electronics device may include an accelerometer, as described herein, and the accelerometer may be used to measure the angle at which the input surface of the force sensor is placed in the predetermined test configuration.

If the force sensor includes an array of sensing elements, it may be particularly useful for surface 600 to be substantially smooth in the example configuration of FIG. 6B, so that the applied force to each sensing element may be substantially equal. Alternatively, it may be useful for one or more of the predetermined test configurations to include a non-equal applied force. For, example, placing the personal electronics device into such a predetermined test configuration may include placing the personal electronics device such that the input surface of the force sensor is substantially horizontal and facing upward, and placing a preselected calibration object on a calibration portion of the input surface of the force sensor. The preselected calibration object may be a number of things, such as another personal electronics device (say placing a smart phone on a specific part of the input surface of a tablet computer), a coin (stack of coins), or an object provided with the personal electronics device specifically for this purpose. In the case of an object not provided specifically for this purpose, such as a coin, it may be useful for the personal electronics device to provide a query for the use to input the exact object, for example, a US quarter or a one euro coin. If the input surface of force sensor is co-located with a display of the personal electronics device, it may be useful for the personal electronics device to provide a display image, such as a silhouette of the object, to identify the predetermined location on the input surface to place the preselected calibration object. If the preselected calibration object is to be placed at a number of predetermined locations on the input surface, these locations may be displayed serially as the recalibration values are measured in each test configuration.

Once all of the test configurations have been tested, a recalibrated value is calculated for at least one of the calibration parameter(s), step 508, based on the at least one calibrated value(s) and the measured recalibration value(s). In one example embodiment, the calibration parameter may be the measured value of the force sensor for zero applied force to the input surface, and the predetermined test configuration may involve placing personal electronics device 400 on substantially horizontal surface 600 with input surface facing upward, as shown in FIG. 6A. In this example embodiment, calculating the recalibrated value is merely setting the recalibrated value of the force sensor for zero applied force equal to the measured recalibration value. (For a force sensor including an array of sensing elements, this is done for each sensing element.)

In another example embodiment, the calibration parameters include the measured value of the force sensor for zero applied force to the input surface, a sensor gain factor scaling the measured values of the force sensor to the applied force (or rate of change of the measured values), and the weight of the personal electronics device (assuming nominal earth gravity). The predetermined test configurations may involve placing personal electronics device 400 in the configurations shown in FIGS. 6A and 6B. In this example embodiment, calculating the recalibrated values includes setting the recalibrated value of the force sensor for zero applied force equal to the measured recalibration value in the first predetermined test configuration, and calculating a slope between the measured recalibration value in the first predetermined test configuration (FIG. 6A, with the applied force equal to zero) and the measured recalibration value in the second predetermined test configuration (FIG. 6B, with the applied force equal to the weight of the personal electronics device).

In a further example embodiment, the force sensor may be a capacitive (or an inductive) force sensor, including a first sensor plate fixedly coupled to the input surface and a second sensor plate separated from the first sensor plate by a compressible gap. The calibration parameter for which the recalibrated value is to be calculated may be one of the effective separation between the sensor plates or the width of the compressible gap, with zero applied force on the input surface. (Alternatively, the calibration parameter may be the capacitance (or inductance) value at zero applied force.) The recalibration value (measured in step 504) may the measured capacitance (or inductance) value between the sensor plates with zero applied force on the input surface. The recalibrated value for the effective separation between the sensor plates or the width of the compressible gap for zero applied force may be calculated from the measure capacitance (or inductance) value as described in detail above. In the case in which the sensor plates are designed to form an array of capacitive (or inductive) sensing elements, the effective separation between the sensor plates or the width of the compressible gap for each capacitive (or inductive) sensing element may be calculated from the corresponding measure capacitance (or inductance) value.

In an additional example embodiment in which the force sensor is a capacitive (or an inductive) force sensor and the example method includes measuring capacitance (or inductance) values for the example force sensor in the two example test configurations of FIGS. 6A and 6B, the calibration parameters may include the capacitance (or inductance) value of the force sensor for zero applied force on the input surface (or alternatively, one of the effective separation between the sensor plates or the width of the compressible gap), a sensor capacitance (or inductance) gain, and the weight of the personal electronics device. The recalibrated capacitance (or inductance) value may be set equal to the measured recalibration capacitance (or inductance) value in the first predetermined test configuration of FIG. 6A, and the sensor capacitance (or inductance) gain may be the slope of the measured recalibration capacitance (or inductance values versus applied force in the predetermined test configurations (FIG. 6A, with the applied force equal to zero and FIG. 6B, with the applied force equal to the weight of the personal electronics device).

In yet another example embodiment in which the force sensor is a capacitive (or an inductive) force sensor and the sensors plate of the force sensor are designed to form an array of capacitive (or inductive) sensing elements, the example method may include measuring element capacitance (or inductance) values for each sensing element (or a sub set thereof) the example force sensor in at least two example test configurations. The first predetermined test configuration may involve placing personal electronics device 400 on substantially horizontal surface 600 with input surface facing upward, as shown in FIG. 6A. The other predetermined test configuration(s) may involve placing a preselected calibration object on one or more calibration portions of the input surface of the force sensor.

The element recalibration capacitance (or inductance) values of the force sensor are measured for each capacitive (or inductive) sensing element in each predetermined test configuration. The element recalibration capacitance (or inductance) values from the first predetermined test configuration may be used to calculate the recalibrated value for the effective separations between the sensor plates or the width of the compressible gap for zero applied force (or the element capacitance (or inductance) value at zero applied force) for each capacitive (or inductive) sensing element. The element recalibration capacitance (or inductance) values from the other predetermined test configuration(s) may be used to calculate the recalibrated value(s) of the element capacitive (or inductive) sensor gain, and/or recalibrated (x, y) deformation maps of the input surface of the example capacitive (or inductive) force sensor.

Figure 7:
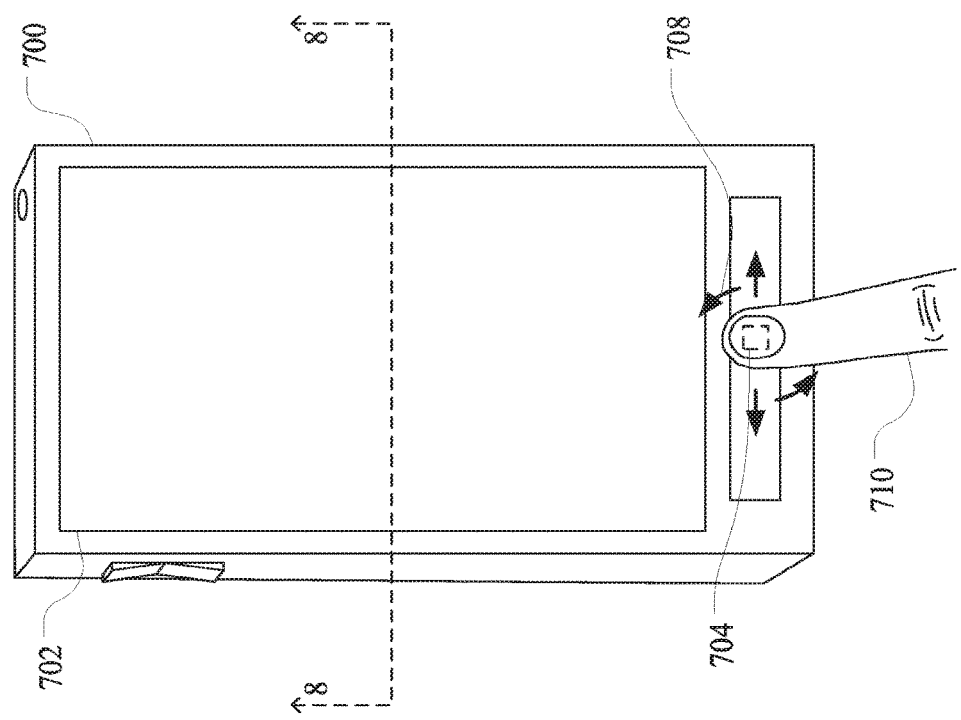
FIG. 7 is a front perspective view of another example of a personal electronic device including a force sensor, as described herein.

Example embodiments, as described herein, include personal electronics devices with inertially compensated force sensors. FIG. 7 illustrates example personal electronics device 700, shown as a smartphone; however, the selection of a smartphone as example personal electronics device 700 in FIG. 7 is merely illustrative and is not intended as limiting. Example personal electronics device 700 may include an inertially compensated force sensor under display 702. FIG. 7 also shows user finger 710 operating input sensor 704 with motion 708. It is contemplated that input sensor 704 may include an inertially compensated force sensor as well.

Such example personal electronics devices may include: a force sensor including an input surface; an accelerometer; and inertial compensation circuitry coupled to the accelerometer and the force sensor.

The example force sensor may be adapted to provide a sensor signal that is representative of the total force normal to the input surface measured by the force sensor. As described in detail above, this total force may include an applied force and an inertial force. The inertial force may be due to various accelerations of the personal electronics device, including, but not limited to: gravity; acceleration of a vehicle that the user is riding in such as a car, airplane, or an elevator; other movement by the user; jostling of the personal electronics device, including that experienced riding on a bumpy road; dropping or hitting the personal electronics device; and so forth. The sensor signal may be an analog or a digital signal including a series of measured force values of the force sensor and, in the case of an example force sensor including an array of sensing elements, the sensor signal may include a number of multiplexed element sub-signals corresponding to the individual sensing elements (or subsets of the sensing elements such as rows or blocks of elements).

The accelerometer is adapted to provide an accelerometer signal representative of acceleration of the personal electronics device. The accelerometer may be a MEMS or other type of electronic acceleration sensor that may be included in the personal electronics device. Some personal electronics devices may currently include accelerometers for other purposes. In these personal electronics devices the existing accelerometer(s) may be used to additionally provide the accelerometer signal to the inertial compensation circuitry as described herein, or a dedicated accelerometer may be added to the personal electronics device. In example embodiments in which the force sensor includes two sensing plates, two accelerometers couple to the structure supporting these two sensing plate may be used to independently measure the acceleration of each sensing plate. It is noted that in example embodiments in which the accelerometer is not directly coupled to the force sensor (or one of the sensing plates), the acceleration experienced by the force sensor may be different from that measured by the accelerometer. In such cases, the personal electronics device may be calibrated to compensate for this difference. The acceleration signal may be delayed to overcome a lag between the acceleration measured by the accelerometer and the acceleration experienced by the force sensor.

In many example embodiments, as described herein, the example force sensor may only be significantly affected by the component of the acceleration of the personal electronics device that is normal to the input surface of the force sensor. Therefore, in some example embodiments, the accelerometer may be adapted to only measure this component of the acceleration of the personal electronics device. It is contemplated in other example embodiments that there may be coupling between other components of the acceleration of the personal electronics device and total force measured by the force sensor. In such example embodiments, it may be useful for the accelerometer to be adapted to measure two or more translational components of the acceleration of the personal electronics device and/or one or more of the rotational components of the acceleration of the personal electronics device.

In example personal electronics devices with inertially compensated force sensors described herein, the sensor signal may include a sequence of sensor values measured periodically, where each sensor value is representative of the total force normal to the input surface measured by the force sensor during a corresponding sensor time interval. And the accelerometer signal may include a sequence of acceleration values also measured periodically, where each acceleration value is representative of the acceleration of the personal electronics device measured by the accelerometer during a corresponding accelerometer time interval.

In some example embodiments, the length of the accelerometer time intervals may be shorter than the length of the sensor time intervals, or the accelerometer signal may have a higher data frequency than the sensor signal. In this case, for each sensor time interval, it may be useful to select one acceleration value corresponding to an accelerometer time interval that falls within (or mostly within) a sensor time interval may be associated with the sensor time interval. Alternatively, for each sensor time interval, the acceleration values corresponding to all of the accelerometer time intervals that fall within (or mostly within) a sensor time interval may be averaged to generate an effective acceleration value to associate with the sensor time interval. In either of these alternative approaches, it is noted that higher frequency acceleration information may be lost; however, example force sensors may be relatively unaffected by accelerations having a frequency greater than the sampling rate of the force sensor, so this loss of acceleration data may not significantly affect inertial compensation of the example force sensor.

The inertial compensation circuitry is adapted to receive the sensor signal and the accelerometer signal and determine an inertial compensation signal based on the accelerometer signal and at least one inertial compensation parameter of the force sensor. This inertial compensation signal is representative of the inertial force that measurable by the force sensor.

In example embodiments in which the sensor signal includes a sequence of sensor values and the accelerometer signal includes a sequence of acceleration values, the inertial compensation circuitry is further adapted to synchronize the received sensor signal and the received accelerometer signal, such that at least one accelerometer time interval is temporally correlated to each sensor time interval as described above. An inertial compensation value is determined for each sensor time interval based on the acceleration value(s) temporally correlated to the sensor time interval and the inertial compensation parameter(s) of the force sensor.

The inertial compensation circuitry then biases the sensor signal responsive to the inertial compensation signal to generate an acceleration compensated force signal. In example embodiments in which a sequence of inertial compensation values is determined from sequences of sensor values and acceleration values, the corresponding inertial compensation value is subtracted from the sensor value for each sensor time interval to generate a sequence of acceleration compensated force values to be the acceleration compensated force signal.

The inertial compensation circuitry may include a number of elements such as: one or more discrete circuitry elements; one or more general purpose integrated circuits; one or more programmable integrated circuits, instructed to execute processes of the inertial compensation circuitry; one or more application specific integrated circuits; or one or more general purpose processor elements, instructed to execute processes of the inertial compensation circuitry. These elements may be entirely part of the general processing circuitry of the personal electronics device that may also be used for other processing tasks by the personal electronics device, or the inertial compensation circuitry may be completely, or partially, special purpose processing circuitry.

Example embodiments of personal electronics devices with inertially compensated force sensors may include personal electronics devices with inertially compensated capacitive (or inductive) force sensors. FIG. 8A is an end cut-away drawing illustrating several example structural components of example personal electronics device 700 of FIG. 7 including an inertially compensated capacitive (or inductive) force sensors. A number of components of example personal electronics device 700, including all of the electronic components of the example device, have been omitted for clarity. The example components illustrated include the device housing 800. Cover glass 802, which together with the housing forms the outer device case, provides some structural stiffness to personal electronics device 700, but it can only provide so much stiffness, particularly given that for a number of reasons, cover glass 802 may not be rigidly coupled to the side frame of housing 800. For example cover glass 802 may be coupled to housing 800 elastically, with some freedom of movement. As the first sensing plate 806 of the force sensor is fixedly coupled to (or within, as illustrated in FIG. 8A) cover glass 802 and the external surface of cover glass 802 serves as the input surface of the example force sensor, this ability of cover glass 802 to move relative to housing 800 may provide at least part of the deformation of the input surface of the force sensor from which applied forces are measured. Elastic coupling of cover glass 802 to housing 800 may also affect the movement of cover glass 802 relative to housing 800 due to acceleration. It may be useful to account for such effects in the inertial compensate calculation of the inertial compensation circuitry. It is noted that cover glass 802 may include, in addition to sensing plate 806 of the example force sensor, other components such as touch sensors and/or a display stack, as illustrated in FIGS. 2A and 2B.

Second sensing plate 808 of the example force sensor is fixedly coupled to an internal structural member of personal electronics device 700. In the example embodiment of FIG. 8A, second sensing plate 808 is fixedly coupled to midplate 804 of personal electronics device 700. Midplate 804 is typically been used to provide significant stiffness to personal electronics devices of this type, particularly stiffness against compressive forces to the side frames of housing 800. Midplate 804 may also provide stiffness to protect against torsional forces. However, in many example embodiments, it may be useful to reduce the volume and/or the weight of midplate 804. Thus, midplate 804 (or another internal structural member to which second sensing plate 808 may be fixedly coupled) may be capable of flexing under accelerations. In many example personal electronics devices, such as example personal electronics device 700, midplate 804 may be capable of flexing significantly farther than cover glass 802 under the influence of accelerations.

Such flexing by midplate 804 may affect separation 810 between first sensing plate 806 and second sensing plate 808 of the example capacitive (or inductive) force sensor of FIG. 8A. FIG. 8B illustrates how midplate 804 may flex under example upward acceleration 814. (Note that upward acceleration 814 may represent the apparent acceleration, due to gravity, experienced by example personal electronics device 700 at rest with the input surface of the force sensor facing upward.) This flexing of midplate 804 leads to an increase in separation 810' near the edge of first sensing plate 806 and second sensing plate 808, and a larger increase in separation 810" between first sensing plate 806 and second sensing plate 808 near the middle of the example capacitive (or inductive) force sensor. Thus, the example force sensor in FIG. 8B may measure a negative applied force, due to the effect of acceleration 814 on midplate 804.

Figure 8C:
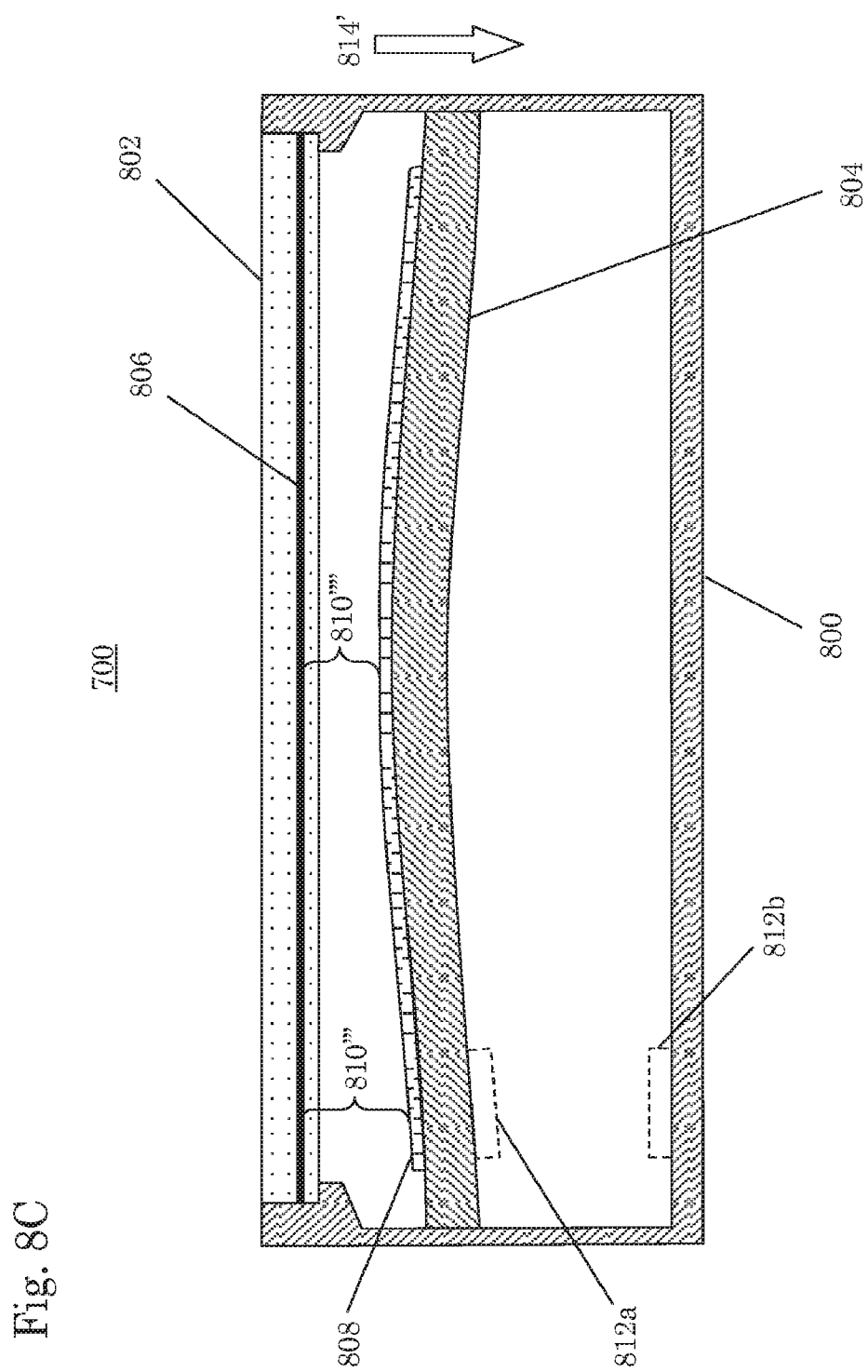
FIG. 8C a simplified side cut-away view of the example personal electronic device of FIG. 7, cut along line 8-8, including the example inertially compensated force sensor of FIG. 8A, during an downward acceleration.

FIG. 8C illustrates how midplate 804 may flex under example downward acceleration 814'. (Note that downward acceleration 814' may represent the apparent acceleration, due to gravity, experienced by example personal electronics device 700 at rest with the input surface of the force sensor facing downward.) This flexing of midplate 804 leads to a decrease in separation 810''' near the edge of the sensing plates, and a larger decrease in separation 810'''' between the middle portions of the sensing plates 806 and 808 of the example capacitive (or inductive) force sensor. Thus, the example force sensor in FIG. 8C may measure a positive applied force, due to the effect of acceleration 814 on midplate 804.

FIG. 8A may illustrate the case in which example personal electronics device 700 is held with the input surface of the force sensor substantially vertical, so that there is substantially no acceleration due to gravity along the direction normal to the input surface. Thus, FIGS. 8A-C may be understood to illustrate how inertial compensation may be useful, even when the personal electronics device is stationary.

In the example embodiments of FIGS. 8A-C, sensor plates 806 and 808 are separated by a compressible gap, which may or may not (as illustrated in FIGS. 8A-C) include all of separation 810. The sensor signal may be a function of the width of the compressible gap, such as the effective separation, or it may be a capacitance (or inductance) value from which the width of the compressible gap could be calculated. The inertial compensation circuitry may use the accelerometer signal and an inertial rate of change of the width of the compressible gap of the force sensor to determine the inertial compensation signal. The inertial rate of change of the width of the compressible gap of the force sensor may be due to displacement of midplate 804 (or another internal structural member to which second sensing plate 80 is fixedly coupled) and/or displacement of cover glass 802 relative to housing 800. The inertial rate of change of the width of the compressible gap of the force sensor may be determined during characterization and calibration of the force sensor, as described herein.

FIG. 8A illustrates two alternative locations at which accelerometer 812 may be attached, on an internal structural member (accelerometer 812a, attached to midplate 804) and on housing 800 (accelerometer 812b). As noted above, if the accelerometer is not directly attached to the force sensor, such as accelerometer 812b attached to housing 800, it may be useful to determine a correction factor for applying the measured acceleration signal to the force sensor. However, as many personal electronics devices may already have an accelerometer, such as accelerometer 812b attached to housing 800, it may be useful to utilize these preexisting accelerometers.

If sensing plates 806 and 808 are designed to form an array of sensing elements, the sensor signal may include a multiplexed plurality of element sub-signals, with each element sub-signal corresponding to one sensing element; and the predetermined inertial rate of change of the width of the compressible gap of the force sensor may include a predetermined inertial rate of change of the element width of the compressible gap corresponding to each sensing element.

In this example embodiment, the inertial compensation circuitry may be further adapted to demultiplex the plurality of element sub-signals and determine an inertial compensation sub-signal corresponding to each sensing element of the force sensor. Each inertial compensation sub-signal may be based on the accelerometer signal and the predetermined inertial rate of change of the element width of the compressible gap corresponding to the sensing element. Each element sub-signal may be biased responsive to the inertial compensation sub-signal of the corresponding sensing element to generate an acceleration compensated force sub-signal and these acceleration compensated force sub-signals may be multiplexed again to generate an acceleration compensated force signal.

In another example embodiment, the inertial compensation circuitry may be adapted to compare the amplitude of the accelerometer signal to a predetermined maximum operating amplitude. If the amplitude of the accelerometer signal is greater than this predetermined maximum operating amplitude, representing an impact or jerk of the personal electronics device, a jerk flag set to indicate this impact or jerk. When the jerk flag is set generation of the acceleration compensated force signal is suspended. Once a reset criterion is met, the jerk flag may be 'unset' and normal operation may continue. The reset criterion may include waiting a predetermined period of time. This predetermined period of time may allow for settling of any vibrations by the components of the personal electronics device that may affect the force sensor. Alternatively, the reset criterion may include waiting until the amplitude of the accelerometer signal falls below a predetermined reset acceleration amplitude and/or the amplitude of the sensor signal measured at a resonant frequency of the force sensor falls below a predetermined reset signal amplitude. In one exemplary embodiment, the reset criterion may include waiting the predetermined period of time, then measuring one or both of the accelerometer signal or the sensor signal to verify that one or both of their amplitudes are in the operating range.

Figure 9:
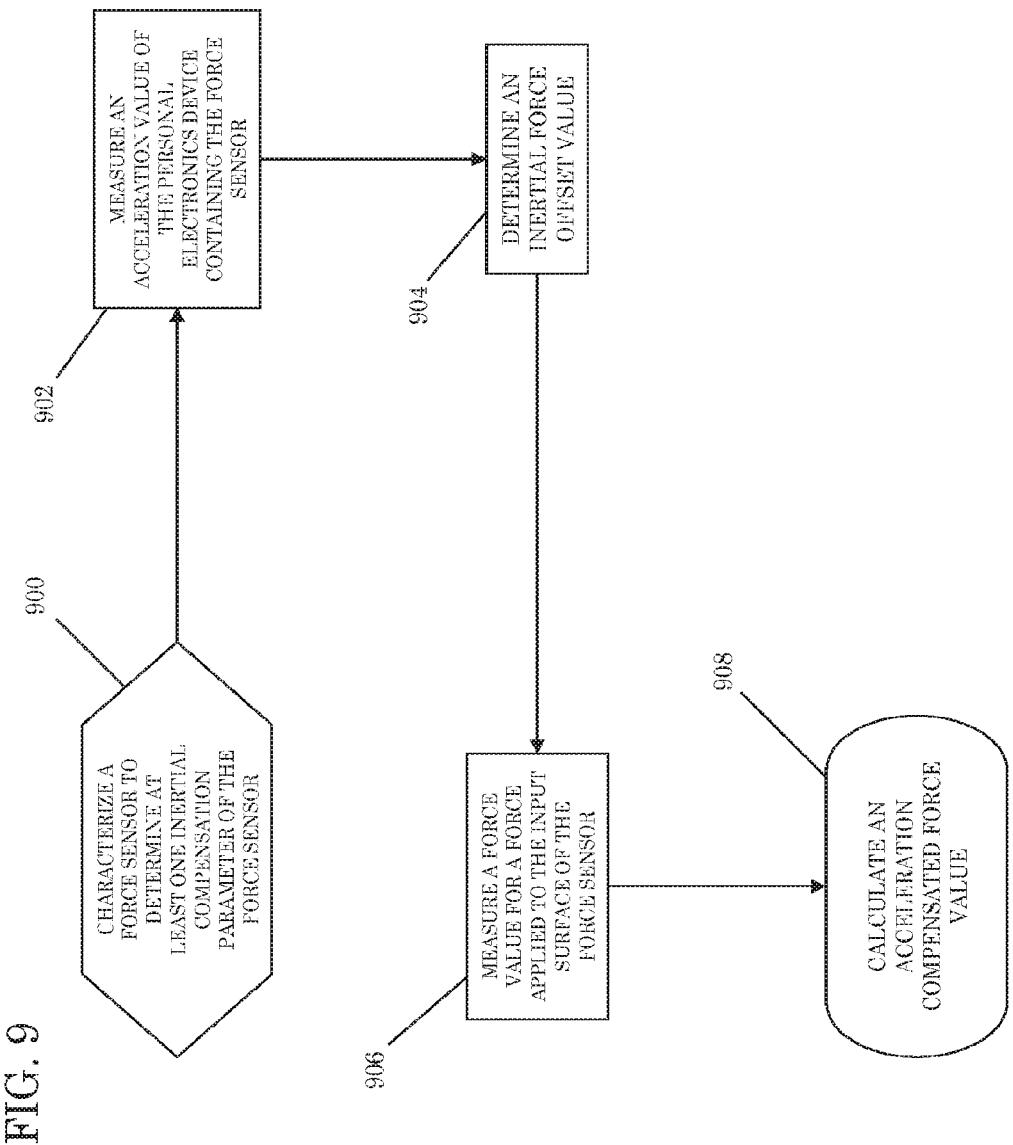
FIG. 9 is a flowchart illustrating an example method of inertial compensation for a force sensor, as described herein.

FIG. 9 illustrates an example method of inertial compensation for a force sensor with an input surface, which is included in a personal electronics device. It is noted that the example method of FIG. 9 may be used with the example inertially compensated force sensor described in detail above; however, the example methods and force sensors described herein are not intended to be so limited.

The force sensor is characterized to determine at least one inertial compensation parameter of the force sensor, step 900. The force sensor may be characterized in a number of ways. One example procedure for characterizing the force sensor to determine at least one inertial compensation parameter of the force sensor includes placing the personal electronics device in a first characterization configuration such that there is approximately zero force applied to the input surface of the force sensor and the normal to the input surface of the force sensor makes a first angle with a vertical axis, for example approximately 0°. A first acceleration value of the personal electronics device is measured and a first force value is measured using the force sensor. The personal electronics device in a second characterization configuration such that approximately zero force is applied to the input surface and the normal to the input surface of the force sensor makes a second angle with the vertical axis, for example approximately 90° or approximately 180°. A second acceleration value of the personal electronics device is measured and a second force value is measured using the force sensor. The inertial compensation parameter(s) of the force sensor are then determined based on the two acceleration values and the two force values. The inertial compensation parameter(s) of the force sensor may include a slope of measured force value as a function of measured acceleration value and/or a zero offset of the measured force value as a function of the measured acceleration value. This slope and zero offset calculated using the first acceleration value and force value as one point on a line and the second acceleration value and force value as a second point on the line.

An acceleration value of the personal electronics device including the characterized force sensor is measured, step 902. As described in detail above, the acceleration value may represent only the translational component of the acceleration along an axis normal to the input surface of the force sensor, or it may represent multiple translational and/or rotational components of the acceleration of the personal electronics device. An inertial force offset value is determined based on the measured acceleration value of the personal electronics device and the inertial compensation parameter(s) of the force sensor, step 904.

A force value for a force applied to the input surface of the force sensor is measured, step 906, and an acceleration compensated force value is calculated based on the force value and the inertial force offset value, step 908.

As described in detail above with reference to FIGS. 8A-D, for example capacitive (or inductive) force sensors described herein, the inertial compensation parameters of the force sensor may include the inertial rate of change of the width of the compressible gap between the sensor plates and a sensor transfer function relating gap width to force value. Determining the inertial force offset value, step 904, in this example embodiment may include multiplying the measured acceleration value of the personal electronics device times the inertial rate of change of a width of the compressible gap of the force sensor to calculate an inertial gap width difference. In this example embodiment, calculating the acceleration compensated force value, step 908, may include calculating a measurement gap width difference from the force value using the sensor transfer function, then calculating a compensated gap width difference by subtracting the inertial gap width difference from the measurement gap width difference. The acceleration compensated force value may then be from the compensated gap width difference using the sensor transfer function. This example method may be useful due to the nonlinear relationship between the capacitance (or inductance) values measured by example capacitive (or inductive) force sensors described herein and the associated gap width differences.

Alternatively, the inertial compensation parameters of an example capacitive (or inductive force sensor, as described herein, may include the inertial rate of change of the force value and a zero acceleration offset force value.

The example method of FIG. 9 may further include comparing the measured acceleration value to a predetermined maximum operating acceleration value before determining the inertial force offset value and, if the acceleration value is greater than the predetermined maximum operating acceleration value, waiting to determine the inertial force offset value until a reset criterion is met. If the acceleration value is not greater than the predetermined maximum operating acceleration value, then the inertial force offset value is determined from the measured acceleration value. The reset criterion may include waiting a predetermined period of time and/or remeasuring the acceleration value until the acceleration value is less than a predetermined reset acceleration value. The reset acceleration value may be the same as the maximum operating acceleration value; however, it is contemplated that it may be useful for the reset acceleration value to be less than the maximum operating acceleration value.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular embodiments. Functionality may be separated or combined in procedures differently in various embodiments of the disclosure or described with different terminology. These and other variations, modifications, additions, and improvements may fall within the scope of the disclosure as defined in the claims that follow.

The invention claimed is:

1. A personal electronics device, comprising:
a force sensor including an input surface, the force sensor adapted to provide a sensor signal representative of a total force normal to the input surface measured by the force sensor, the force sensor including first and second sensor plates;
a first accelerometer adapted to provide a first accelerometer signal representative of acceleration of the first sensor plate;
a second accelerometer adapted to provide a second accelerometer signal representative of acceleration of the second sensor plate; and
inertial compensation circuitry coupled to the first and second accelerometers and the force sensor, the inertial compensation circuitry adapted to:
receive the sensor signal and the first and second accelerometer signals;
determine an inertial compensation signal based on the first and second accelerometer signals and at least one inertial compensation parameter of the force sensor, the inertial compensation signal representative of an inertial force measurable by the force sensor; and
bias the sensor signal responsive to the inertial compensation signal to generate an acceleration compensated force signal.

2. The personal electronics device of claim 1, further comprising:
a housing coupled to the input surface of the force sensor; and
an internal structural member coupled to the housing; wherein:
the first sensor plate is fixedly coupled to the input surface of the force sensor;
the second sensor plate is fixedly coupled to the internal structural member of the personal electronic device;
the first sensor plate and the second sensor plate are separated by a compressible gap;
the sensor signal is a function of a width of the compressible gap; and
the inertial compensation circuitry is further adapted to determine the inertial compensation signal based on the first and second accelerometer signals and a predetermined inertial rate of change of the width of the compressible gap of the force sensor.

3. The personal electronics device of claim 2, wherein:
the force sensor is one of:
a capacitive force sensor; or
an inductive force sensor.

4. The personal electronics device of claim 2, further comprising:
a cover glass coupled to the housing, the cover glass having an external surface and an internal surface; and
a display stack fixedly coupled to the internal surface of the cover glass;
wherein:

the external surface of the cover glass is the input surface of the force sensor;

the first sensor plate is fixedly coupled to the display stack;

the internal structural member has a member inertial rate of displacement relative to the housing in a direction normal to the input surface of the force sensor relative to the housing;

the cover glass has a cover glass inertial rate of displacement relative to the housing in the direction normal to the input surface of the force sensor; and the predetermined inertial rate of change of the width of the compressible gap of the force sensor is approximately equal to a difference between the member inertial rate of displacement and the cover glass inertial rate of displacement.

5. The personal electronics device of claim 4, wherein the member inertial rate of displacement is significantly greater than the cover glass inertial rate of displacement, such that the predetermined inertial rate of change of the width of the compressible gap of the force sensor is approximately equal to the member inertial rate of displacement.

6. The personal electronics device of claim 2, wherein the accelerometer is attached to one of:
the housing; or
the internal structural member.

7. The personal electronics device of claim 2, wherein:
the first sensor plate and the second sensor plate of the force sensor are designed to form an array of sensing elements;
the sensor signal includes a multiplexed plurality of element sub-signals, each element sub-signal corresponding to one sensing element and being a function of an element width of the compressible gap in the one sensing element;
the predetermined inertial rate of change of the width of the compressible gap of the force sensor includes a predetermined inertial rate of change of the element width of the compressible gap corresponding to each sensing element of the array of sensing elements of the force sensor; and
the inertial compensation circuitry is further adapted to:
demultiplex the plurality of element sub-signals;
determine an inertial compensation sub-signal corresponding to each sensing element of the force sensor based on the first and second accelerometer signals and the predetermined inertial rate of change of the element width of the compressible gap corresponding to the sensing element, each inertial compensation sub-signal representative of the inertial force measurable by the corresponding sensing element;
bias each element sub-signal responsive to the inertial compensation sub-signal of the corresponding sensing element to generate an acceleration compensated force sub-signal; and
multiplex the acceleration compensated force sub-signals to generate an acceleration compensated force signal.

8. The personal electronics device of claim 1, wherein:
the sensor signal includes a sequence of sensor values measured periodically, each sensor value representative of the total force normal to the input surface measured by the force sensor during a corresponding sensor time interval;
the first accelerometer signal includes a first sequence of acceleration values measured periodically, each first acceleration value representative of the acceleration of the first sensor plate measured by the first accelerometer during a corresponding accelerometer time interval;
the second accelerometer signal includes a second sequence of acceleration value measured periodically, each second acceleration value representative of the acceleration of the second sensor plate measured by the second accelerometer during the corresponding accelerometer time interval;
the acceleration compensated force signal includes a sequence of acceleration compensated force values, each acceleration compensated force value corresponding to one sensor time interval; and
the inertial compensation circuitry is further adapted to:
synchronize the received sensor signal and the received first and second accelerometer signals, such that at least one accelerometer time interval is temporally correlated to each sensor time interval;
determine an inertial compensation value for each sensor time interval based on at least one first and second acceleration value of the at least one accelerometer time interval temporally correlated to the sensor time interval and the at least one inertial compensation parameter of the force sensor; and
generate the sequence of acceleration compensated force values by subtracting the inertial compensation value from the sensor value for each sensor time interval.

9. The personal electronics device of claim 1, wherein the inertial compensation circuitry is further adapted to:
compare an amplitude of the first or second accelerometer signals to a predetermined maximum operating amplitude;
if the amplitude of the first or second accelerometer signals is greater than the predetermined maximum operating amplitude, set a jerk flag; and
if the jerk flag is set:
suspend generation of the acceleration compensated force signal; and
unset the jerk flag when a reset criterion is met.

10. The personal electronics device of claim 9, wherein the reset criterion of the inertial compensation circuitry includes at least one of:
a predetermined period of time;
the amplitude of the first or second accelerometer signals falling below a predetermined reset acceleration amplitude; or
an amplitude of the sensor signal measured at a resonant frequency of the force sensor falling below a predetermined reset signal amplitude.

11. The personal electronics device of claim 1, wherein the inertial compensation circuitry includes at least one of:
one or more discrete circuitry elements;
one or more general purpose integrated circuits;
one or more programmable integrated circuits, instructed to execute processes of the inertial compensation circuitry;
one or more application specific integrated circuits; or
one or more general purpose processor elements, instructed to execute processes of the inertial compensation circuitry.

12. The personal electronics device of claim 1, wherein the first accelerometer signal provided by the first accelerometer is representative of a translational acceleration of the first sensor plate device along an axis normal to the input surface of the force sensor measured by the first accelerometer.

13. A method of inertial compensation for a force sensor included in a personal electronics device, the force sensor including an input surface and first and second sensor plates, the method comprising:
  characterizing the force sensor to determine at least one inertial compensation parameter of the force sensor;
  measuring a first acceleration value of the first sensor plate;
  measuring a second acceleration value of the second sensor plate;
  determining an inertial force offset value based on the measured first acceleration value of the first sensor plate, the second acceleration value of the second sensor plate, and the at least one inertial compensation parameter of the force sensor;
  measuring a force value for a force applied to the input surface of the force sensor; and
  calculating an acceleration compensated force value based on the force value and the inertial force offset value.

14. The method of claim 13, wherein characterizing the force sensor to determine at least one inertial compensation parameter of the force sensor includes;
  placing the personal electronics device in a first characterization configuration such that:
  approximately zero force is applied to the input surface of the force sensor; and
  a normal to the input surface of the force sensor makes a first angle with a vertical axis;
  measuring a first personal electronics device acceleration value;
  measuring a first force value using the force sensor;
  placing the personal electronics device in a second characterization configuration such that:
  approximately zero force is applied to the input surface of the force sensor; and
  the normal to the input surface of the force sensor makes a second angle with the vertical axis;
  measuring a second personal electronics device acceleration value;
  measuring a second force value using the force sensor; and
  determining at least one inertial compensation parameter of the force sensor based on the first personal electronics device acceleration value, the first force value, the second personal electronics device acceleration value, and the second force value.

15. The method of claim 14, wherein:
  the first angle is approximately 0°; and
  the second angle is one of approximately 90° or approximately 180°.

16. The method of claim 14, wherein determining at least one inertial compensation parameter of the force sensor includes calculating a slope of measured force value as a function of measured first and second personal electronics device acceleration values using the first personal electronics device acceleration value, the first force value, the second personal electronics device acceleration value, and the second force value.

17. The method of claim 16, wherein determining at least one inertial compensation parameter of the force sensor further includes calculating a zero offset of the measured force value as a function of the measured first and second personal electronics device acceleration values using the first personal electronics device acceleration value, the first force value, the second personal electronics device acceleration value, and the second force value.

18. The method of claim 13, wherein measuring the first acceleration value of the first sensor plate includes measuring the first acceleration value of the first sensor plate along an axis normal to the input surface of the force sensor.

19. The method of claim 13, wherein:
  the first sensor plate is fixedly coupled to the input surface of the force sensor; and
  the second sensor plate is fixedly coupled to an internal structural member of the personal electronics device;
  the first sensor plate and the second sensor plate are separated by a compressible gap;
  the at least one inertial compensation parameter of the force sensor includes:
  an inertial rate of change of a width of the compressible gap; and
  a sensor transfer function relating gap width to force value;
  determining the inertial force offset value includes multiplying the measured first and second acceleration values of the first and second sensor plates times the inertial rate of change of a width of the compressible gap of the force sensor to calculate an inertial gap width difference; and
  calculating the acceleration compensated force value includes:
  calculating a measurement gap width difference from the force value using the sensor transfer function;
  calculating a compensated gap width difference by subtracting the inertial gap width difference from the measurement gap width difference; and
  calculating the acceleration compensated force value from the compensated gap width difference using the sensor transfer function.

20. The method of claim 13, further comprising:
  comparing the first or second acceleration values to a predetermined maximum operating acceleration value before determining the inertial force offset value, and:
  if the first or second acceleration values is greater than the predetermined maximum operating acceleration value, waiting to determine the inertial force offset value until a reset criterion is met; otherwise
  determining the inertial force offset value.

21. The method of claim 20, wherein the reset criterion includes at least one of:
  a predetermined period of time; or
  remeasuring the first or second acceleration values until the first or second acceleration values is less than a predetermined reset acceleration value.

22. A personal electronic device, comprising:
  a housing;
  a display elastically coupled to the housing;
  a force sensor coupled to the display, the force sensor including first and second sensor plates;
  a first accelerometer;
  a second accelerometer; and
  circuitry coupled to the force sensor and the first and second accelerometers operable to:
  receive a force signal from the force sensor indicating an amount of force exerted on the display;
  receive a first acceleration signal from the first accelerometer indicating a first acceleration of the first sensor plate;
  receive a second acceleration signal from the second accelerometer indicating a second acceleration of the second sensor plate; and generate an inertially compensated force signal by adjusting the amount of force indicated by the force signal using the first and second acceleration signals.

23. The personal electronic device of claim 22, wherein the first accelerometer measures a portion of the first acceleration of the first sensor plate.

24. The personal electronic device of claim 22, wherein the first accelerometer ignores a portion of the first acceleration of the first sensor plate.

25. The personal electronic device of claim 22, wherein a force value measured by the force sensor is configured to have a relation to the first acceleration of the first sensor plate or the second acceleration of the second sensor plate.

26. The personal electronic device of claim 22, wherein:
the force sensor includes a compressible gap; and
a dimension of the compressible gap is configured to change as the first acceleration of the first sensor plate or the second acceleration of the second sensor plate changes.

* * * * *